(12) United States Patent
Zhong et al.

(10) Patent No.: US 12,184,728 B2
(45) Date of Patent: *Dec. 31, 2024

(54) METHODS AND APPARATUS TO ADAPTIVELY MANAGE DATA COLLECTION DEVICES IN DISTRIBUTED COMPUTING SYSTEMS

(71) Applicant: Intel Corporation, Santa Clara, CA (US)

(72) Inventors: Tao Zhong, Beijing (CN); Gang Deng, Beijing (CN); Zhongyan Lu, Beijing (CN); Kshitij Doshi, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/971,337

(22) Filed: Oct. 21, 2022

(65) Prior Publication Data

US 2023/0156084 A1    May 18, 2023

Related U.S. Application Data

(63) Continuation of application No. 17/353,142, filed on Jun. 21, 2021, now Pat. No. 11,483,389, which is a
(Continued)

(51) Int. Cl.
*G06F 15/16* (2006.01)
*H04L 12/66* (2006.01)
(Continued)

(52) U.S. Cl.
CPC .............. *H04L 67/12* (2013.01); *H04L 12/66* (2013.01); *H04L 41/069* (2013.01);
(Continued)

(58) Field of Classification Search
CPC . H04L 41/0816; H04L 41/0893; H04L 43/04; H04L 43/0876; H04L 47/24
See application file for complete search history.

(56) References Cited

U.S. PATENT DOCUMENTS

| 8,275,824 B2* | 9/2012 | Jung | ............... G01D 9/005 |
| | | | 709/200 |
| 9,595,115 B1 | 3/2017 | Cederlof | |
| | | (Continued) | |

FOREIGN PATENT DOCUMENTS

| CN | 101350915 A | 1/2009 |
| CN | 103347165 A | 10/2013 |
| | (Continued) | |

OTHER PUBLICATIONS

Madden et. al.; The Design of Acquisitional Query Processor For Sensor Networks; Jun. 2003, SIGMOD, 14 pages (Year: 2003).*

(Continued)

*Primary Examiner* — Oleg Survillo
(74) *Attorney, Agent, or Firm* — Hanley, Flight & Zimmerman, LLC

(57) ABSTRACT

Methods and apparatus to adaptively manage data collection devices in distributed computing systems are disclosed. Example disclosed methods involve instructing a first data collection device to operate according to a first rule. The example first rule specifies a first operating mode and defining a first event of interest. Example disclosed methods also involve obtaining first data from the first data collection device while operating according to the first rule. Example disclosed methods also involve, in response to determining that the first event of interest has occurred based on the first data, providing a second rule based on the first data to the first data collection device, and providing a third rule to a second data collection device. The example second rule (Continued)

specifies a second operating mode and defines a second event of interest, and the examples third rule specifies a third operating mode.

20 Claims, 10 Drawing Sheets

Related U.S. Application Data continuation of application No. 15/574,705, filed as application No. PCT/CN2015/082527 on Jun. 26, 2015, now Pat. No. 11,044,316.

(51) Int. Cl.
| | |
|---|---|
| H04L 41/069 | (2022.01) |
| H04L 41/0816 | (2022.01) |
| H04L 43/04 | (2022.01) |
| H04L 67/12 | (2022.01) |
| H04N 7/18 | (2006.01) |
| H04L 41/0893 | (2022.01) |
| H04L 41/142 | (2022.01) |
| H04L 41/147 | (2022.01) |
| H04L 43/0882 | (2022.01) |
| H04W 4/70 | (2018.01) |

(52) U.S. Cl.
CPC .......... *H04L 41/0816* (2013.01); *H04L 43/04* (2013.01); *H04N 7/181* (2013.01); *H04N 7/188* (2013.01); *H04L 41/0893* (2013.01); *H04L 41/142* (2013.01); *H04L 41/147* (2013.01); *H04L 43/0882* (2013.01); *H04W 4/70* (2018.02)

(56) References Cited

U.S. PATENT DOCUMENTS

| | | | |
|---|---|---|---|
| 11,044,316 B2 | 6/2021 | Zhong et al. | |
| 11,483,389 B2 | 10/2022 | Zhong et al. | |
| 2002/0161751 A1* | 10/2002 | Mulgund | H04L 41/024 |
| 2005/0234310 A1* | 10/2005 | Alwan | A61B 5/0002 |
| | | | 128/920 |
| 2006/0222209 A1* | 10/2006 | Zhang | G08B 29/188 |
| | | | 382/107 |
| 2007/0288414 A1* | 12/2007 | Barajas | G06N 20/00 |
| | | | 706/46 |
| 2009/0070387 A1* | 3/2009 | Bouse | G05B 23/0264 |
| 2009/0282156 A1* | 11/2009 | Jung | H04L 67/125 |
| | | | 709/228 |
| 2010/0026802 A1* | 2/2010 | Titus | H04N 7/188 |
| | | | 348/143 |
| 2012/0133774 A1 | 5/2012 | Sarhan | |
| 2013/0282149 A1* | 10/2013 | Kuntagod | H04W 4/70 |
| | | | 700/73 |
| 2014/0085480 A1* | 3/2014 | Saptharishi | H04N 21/23113 |
| | | | 348/159 |
| 2014/0132758 A1* | 5/2014 | Saptharishi | G06V 20/54 |
| | | | 348/149 |
| 2014/0355427 A1* | 12/2014 | Cheng | H04L 43/0888 |
| | | | 370/230 |
| 2015/0088442 A1 | 3/2015 | Farrar et al. | |
| 2015/0221191 A1 | 8/2015 | Doyle et al. | |
| 2015/0254575 A1 | 9/2015 | Nere et al. | |
| 2015/0347478 A1* | 12/2015 | Tripathi | G06F 16/248 |
| | | | 707/743 |
| 2016/0070242 A1 | 3/2016 | Kuntagod et al. | |
| 2017/0153610 A1 | 6/2017 | Kuntagod et al. | |
| 2018/0152517 A1 | 5/2018 | Zhong et al. | |
| 2019/0025928 A1* | 1/2019 | Pantelopoulos | A61B 5/6802 |
| 2022/0014591 A1 | 1/2022 | Zhong et al. | |

FOREIGN PATENT DOCUMENTS

| | | |
|---|---|---|
| CN | 103997630 A | 8/2014 |
| CN | 104580233 A | 4/2015 |
| CN | 104715596 A | 6/2015 |
| CN | 104735688 A | 6/2015 |
| EP | 2648389 A1 | 10/2013 |
| JP | 2001157197 A | 6/2001 |
| JP | 2007329636 A | 12/2007 |
| JP | 2014138245 A | 7/2014 |
| JP | 6530087 B2 | 9/2018 |
| WO | 2010144566 A1 | 12/2010 |
| WO | 2014027070 A1 | 2/2014 |

OTHER PUBLICATIONS

Madden et. al., "The Design of an Acquisitional Query Processor for Sensor Networks" Jun. 2003; SIGMOD, 14 pages.

International Searching Authority, "International Search Report," issued in connection with International Application No. PCT/CN2015/082527, dated Mar. 24, 2016, 3 pages.

International Searching Authority, "Written Opinion," issued in connection with International Application No. PCT/CN2015/082527, dated Mar. 24, 2016, 4 pages.

International Bureau, "International Preliminary Report on Patentability," issued in connection with application No. PCT/CN2015/082527, dated Dec. 26, 2017, 6 pages.

European Patent Office, "Extended European Search Report," issued in connection with European Patent Application No. 15896006.2, dated Jan. 7, 2019, 9 pages.

Japanese Patent Office, "Notice of Allowance," issued in connection with Japanese Patent Application No. 2017-560948, dated Apr. 19, 2019, 3 pages.

State Intellectual Property Office of the Peoples Republic of China, "First Office Action," issued in connection with Chinese Patent Application No. 201580080387.9, dated Oct. 8, 2019, 7 pages.

China National Intellectual Property Administration, "Office Action," issued in connection with Chinese Patent Application No. 201580080387.9, dated Mar. 16, 2020, 5 pages.

European Patent Office, "Communication Pursuant to Article 94(3) EPC," issued in connection with European Patent Application No. 15896006.2, dated Apr. 9, 2020, 5 pages.

PRC National Intellectual Property Administration, "Notice of Completing Formalities for Patent Registration," issued in connection with Chinese Patent Application No. 201580080387.9, dated Jul. 8, 2020, 4 pages (including translation).

European Patent Office, "Communication Under Rule 71(3) EPC," issued in connection with European Patent Application No. 15896006.2, dated Nov. 13, 2020, 7 pages.

United States Patent and Trademark Office, "Non-Final Office Action," issued in connection with U.S. Appl. No. 15/574,705, dated Oct. 4, 2019, 10 pages.

United States Patent and Trademark Office, "Final Office Action," issued in connection with U.S. Appl. No. 15/574,705, dated Apr. 17, 2020, 11 pages.

United States Patent and Trademark Office, "Non-Final Office Action," issued in connection with U.S. Appl. No. 15/574,705, dated Sep. 28, 2020, 11 pages.

United States Patent and Trademark Office, "Notice of Allowance and Fee(s) due," issued in connection with U.S. Appl. No. 15/574,705, dated Feb. 5, 2021, 8 pages.

United States Patent and Trademark Office, "Corrected Notice of Allowability," issued in connection with U.S. Appl. No. 15/574,705, dated May 26, 2021, 2 pages.

United States Patent and Trademark Office, "Notice of Allowance and Fee(s) Due," issued in connection with U.S. Appl. No. 17/353,142, dated Jun. 13, 2022, 8 pages.

\* cited by examiner

METHODS AND APPARATUS TO ADAPTIVELY MANAGE DATA COLLECTION DEVICES IN DISTRIBUTED COMPUTING SYSTEMS

RELATED APPLICATIONS

This patent arises from a continuation of U.S. patent application Ser. No. 17/353,142, now U.S. Pat. No. 11,483,389, which was filed on Jun. 21, 2021. U.S. patent application Ser. No. 17/353,142 is a continuation of U.S. patent application Ser. No. 15/574,705, now U.S. Pat. No. 11,044,316, which was filed on Nov. 16, 2017. U.S. patent application Ser. No. 15/574,705 is a § 371 National Stage application of International Patent Application No. PCT/CN2015/082527, which was filed on Jun. 26, 2015. U.S. patent application Ser. No. 17/353,142, U.S. patent application Ser. No. 15/574,705, and International Patent Application No. PCT/CN2015/082527 are hereby incorporated by reference in their entireties. Priority to U.S. patent application Ser. No. 17/353,142, U.S. patent application Ser. No. 15/574,705, International Patent Application No. PCT/CN2015/082527 is hereby claimed.

FIELD OF THE DISCLOSURE

This disclosure relates generally to distributed systems, and, more particularly, methods and apparatus to adaptively manage data collection devices in distributed computing systems.

BACKGROUND

Devices with sensors and electronics embedded within them can be networked together into what is sometimes called, "the Internet of Things." Such devices may be any physical object that includes embedded electronics such as embedded communication circuitry. The Internet of Things includes networked monitoring devices (e.g., cameras, air qualities monitors, remote health monitoring, etc.), home automation devices (e.g., air conditioning, energy management, etc.), and transportation devices (e.g., automated vehicles, vehicle monitors, fleet management, etc.), etc. Various devices, when networked together, produce a large amount of data (e.g., terabytes per day, petabytes per day, etc.). For example, the networked sensors in the engines of a commercial airliner can produce 240 terabytes of data on a flight from New York to Los Angeles.

DETAILED DESCRIPTION

Figure 1:
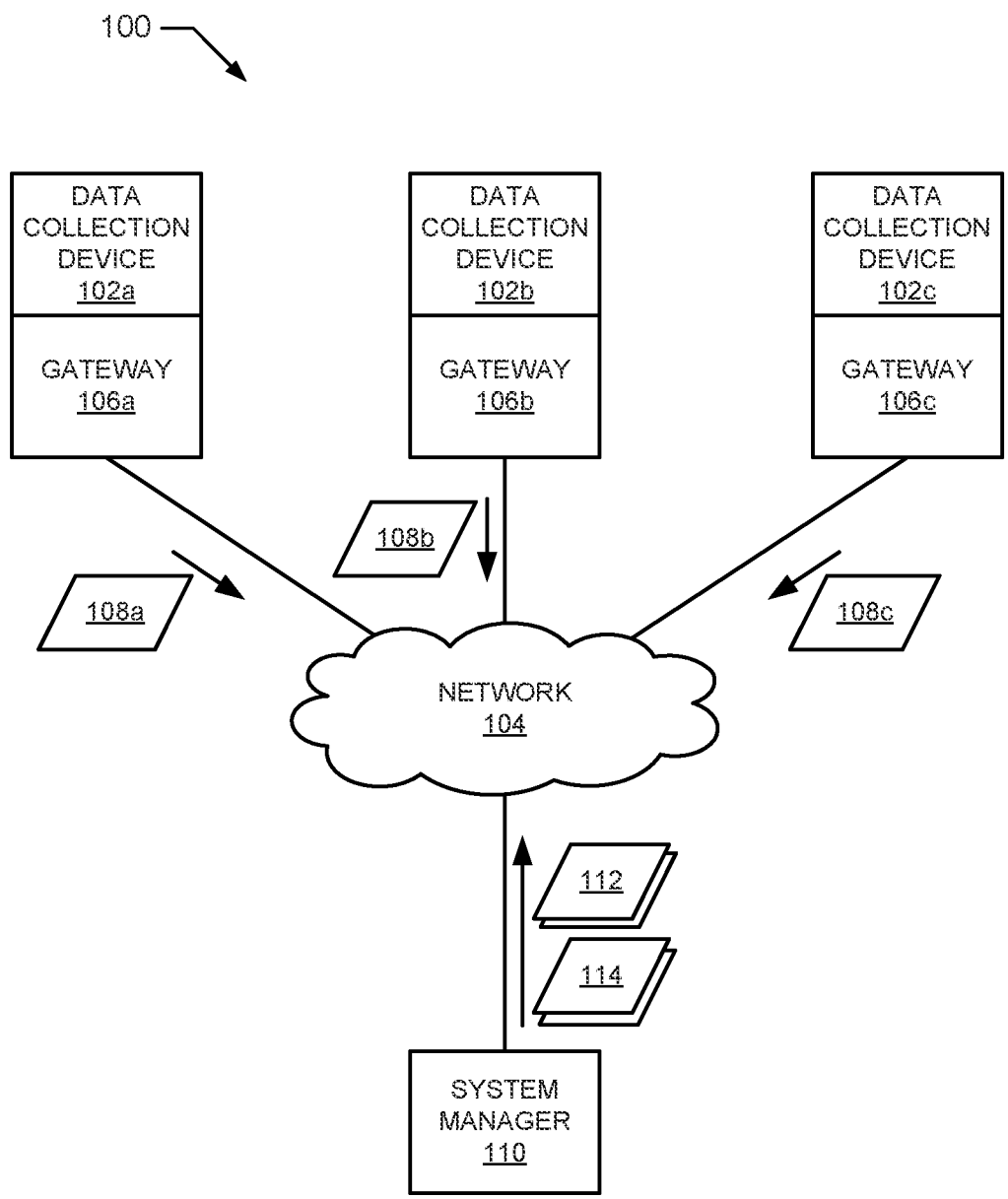
FIG. 1 is a block diagram of an example distributed system for managing data collection devices in accordance with this disclosure.

Examples disclosed herein may be used to adaptively manage data collection devices in a distributed computing system. Example distributed computing systems include data collection devices, which may be geographically distributed, that produce data to be sent to a central processing center (e.g. a distributed computing system manager). Together, the data collection devices may produce a massive amount of data. For example, a large network of closed caption television cameras (CCTVs) across a city may produce 2.2 terabytes of data per minute. When an event of interest occurs, the distributed computing systems can be slow to react because of the massive amount of data. For example, identifying an individual from the CCTV data may be delayed because of all the images that need to be matched against the likeness of the individual. Traditionally, the data collection devices have limited processor and memory resources. Additionally, there is limited bandwidth available across the system to send the data to the central processing center.

In examples disclosed herein, a gateway associated with the data collection device performs real-time processing of data collected by the data collection devices by, for example, demarcating events of interest in the data, concentrating data collected by the data collection device for use by a system manager, and delivering a latency sensitive response to the events of interest. The example system manager performs, for example, real-time processing and deep analytics of the data collected by the data collection devices in the distributed computing system to, for example, complement actions of the gateway to provide updated rules and/or triggers to the gateway based on the data collected by the data collection devices. As used herein, a rule is an instruction or a set of instructions that defines how a data collection device is to collect data, how a gateway is to process data, and/or how the gateway is to detect events of interest. As used herein, a trigger is an instruction or a set of instructions to a gateway that identifies an action for the data collection device associated with the gateway to take in response to the gateway and/or the data collection device detecting an event of interest. In some examples, the gateway and the system manager facilitates a distributed computing system adapting to changes in the distributed computing system (e.g., changes in an environment in which the distributed computing system operates) by managing data collection devices of the distributed computing system as additional data collection devices are added into the system and/or existing data collection devices are upgraded.

In examples disclosed herein, a gateway associated with a data collection device performs data triage on data produced by the data collection device. As used herein, data triage includes one or more of sorting data into categories, detecting events of interest in the data and/or applying correction factors to the data based on rules (e.g. rules from the system manager). The example rules specify criteria used to detect an event of interest. For example, in a CCTV system, a first rule may specify feature points to detect a person of interest with an 80% accuracy, a second rule may specify feature points to detect a person of interest with a 95% accuracy, etc. Additionally or alternatively, example rules may specify adjustments to correct the data collected by the data collection devices. For example, a rule may specify a correction factor to apply to data collected by a low accuracy air quality sensor data collection device. Example rules may also specify a manner of collecting data. For example, a rule may specify that a CCTV camera is to take a picture at 720p resolution every five seconds.

In some examples disclosed herein, a gateway associated with a data collection device determines a quality of the data produced by the data collection device. As used herein, data quality is a measurement of likely usefulness of the data produced by the data collection device. Example rules provided by the system manager may define a data quality metric. For example, a rule for data collected from a CCTV camera may indicate that data representing a series of images that do not contain significant movement is considered low quality data (e.g., has a low data quality metric). As another example, a rule in a system monitoring commercial vehicles may state that data representing long periods in which vehicles are idle (e.g., are not moving) is low quality data.

In examples disclosed herein, the gateway concentrates data produced by a data collection device to reduce low quality data (e.g. repetitive data, useless data, etc.) and to amplify data related to events of interest (e.g. data that is not repetitive). To concentrate data, the example gateway categorizes data, separates independent attributes and dependent attributes within the data, and/or reduces portions of the data based on the rules provided by the system manager. As used herein, an attribute refers to a portion of data from the data collection devices that corresponds to a particular sensor. For examples, if a data collection device has a pressure sensor and a temperature sensor, the data collected from the data collection device includes an attribute corresponding to the pressure sensor and an attribute corresponding to the temperature sensor. Dependent attributes are attributes that are derivable (e.g., calculable, estimable, etc.) from independent attributes. In some examples, the gateway may reduce the data by removing the dependent attributes. For example, if a vehicle monitor records location longitude, location latitude, speed, transmission gear, and engine revolutions per minute (RPM), the gateway may discard the speed and the engine RPM portions of the data because the speed can be calculated based on changes in the longitude and the latitude, and the engine RPM can be calculated and/or estimated based on the speed and the transmission gear. In some examples, if the gateway detects an event of interest, the gateway causes more detailed data (e.g., longitude, latitude, speed, speed gear, and engine RPM) to be collected and/or sent collected for a period of time after event of interest.

In examples disclosed herein, the gateway receives triggers from the system manager. For example, if a camera is part of a traffic control system, a trigger may state that, upon the camera detecting an accident in an intersection (an event of interest), the traffic control system is to change all traffic lights in the intersection to red (an action). Accordingly, the triggers may allow the gateway and/or the example data collection device to react to an event of interest without waiting for instructions from the system manager following an event of interest.

In examples disclosed herein, the system manager receives condensed data from the example gateways in a distributed computing system. The example system manager performs real-time analytics to filter and aggregate the condensed data to determine whether new rules and/or triggers should be sent to one or more of the gateways. Through the real-time analytics, the system manager balances a level of measurement quality in the data that the gateways instruct the data collection devices to collect with the amount of bandwidth utilized by the data collection devices and/or the gateways send the collected data to the system manager. As used herein, the level of measurement quality refers to the accuracy, precision, resolution, sensitivity and/or frequency at which a data collection device captures data. Increasing the level of measurement quality refers to increasing one or more of the accuracy, precision, resolution, sensitivity and/or frequency at which a data collection device captures data. In general, increasing the measurement quality increases the amount of data a data collection device produces and, thus, increases the amount of bandwidth that a corresponding gateway uses to send the data to the system manager. For example, in response to a CCTV camera detecting a person of interest, the system manager may provide a rule, to a corresponding gateway, that instructs the CCTV (data collection device) to increase the resolution of the images captured by the CCTV camera and increases the frequency that the CCTV camera captures images.

Conversely, decreasing the level of measurement quality refers to decreasing one or more of the accuracy, precision, resolution, sensitivity and/or frequency at which data collection device captures data. In general, decreasing the level of data quality decreases the amount of data that the data collection device produces and, thus, decreases the amount of bandwidth that the corresponding gateway uses to send the data to the system manager. For examples, in response to a CCTV camera detecting a person of interest, the system manager may provide a rule to other gateways that decreases the resolution of the images captured by the corresponding CCTV cameras and decreases the frequency that the CCTV cameras capture images.

For example, initially, the system manager may send a first rule to the gateways in the distributed computing system connected to CCTV cameras (data collection devices). In the example, the first rule may instruct the gateways to instruct the corresponding cameras to capture images every ten seconds at a medium resolution (e.g., 640×480 resolution, etc.). In such an example, the system manager may send a second rule defining an event of interest to allow the CCTV cameras to identify a criminal suspect with an 80% certainty. In such an example, when one of the CCTV cameras detects a possible match to the criminal suspect, the system manager may sends a third rule to the corresponding gateway. The third rule may instruct the gateway to instruct the corresponding camera to capture images every two seconds at a high resolution (e.g., 720p, etc.). As a result, the amount of data sent to the system manager from the particular gateway increases. In such an example, the system manager may also send the particular gateway a fourth rule defining an event of interest to allow the CCTV camera to identify the criminal suspect with a 99% certainty. In addition, the system manager may send a fifth rule to the other gateways to instruct the corresponding CCTV cameras to capture images every twenty seconds at a low resolution (e.g., 352×240 resolution, etc.). As a result, the amount of data sent to the system manager from the gateways operating according to the fifth rule decreases.

In examples disclosed herein, the system manager also performs deep analytics on the condensed data received from the gateways. The deep analytics include, for example, data mining, machine learning, data modeling, and data organization. In some examples, the deep analytics are used to generate and/or modify rules and/or triggers. In some examples, generate a rule that allows the gateways to summarize the collected data, the system manager performs cluster analysis (e.g., k-means analysis, etc.) to categorize aggregated data from the gateways in the distributed computing system. In some such examples, the system manager identifies independent attributes and builds model trees for each category. In some examples, the system manager generates rules that contain correction factors. In such examples, the rule allows the gateway to correct data before it is sent to the system manager.

FIG. 1 depicts an example distributed computing system 100 with data collection devices 102a-102c connected to an example network 104 (e.g., a wide area network, a local area network, the Internet, a cellular network, etc.). The example data collection devices 102a-102c include sensor(s) used to collect data and/or actuator(s) used to control the data collection devices 102a-102c. In the illustrated example of FIG. 1, the data collection devices 102a-102c have variable data collection abilities that allow the accuracy, precision, resolution, sensitivity, and/or frequency of the data collection to be adjusted. For example, the data collection devices 102a-102c may be CCTV cameras that can capture images and/or video at different resolutions (e.g., 352×240 resolution, 640×480 resolution, 1280×720 resolution, etc.) and/or at different frequencies (e.g., continuous, once every second, once every five seconds, etc.).

The example data collection devices 102a-102c are associated with corresponding gateways 106a-106c. In some examples, the data collection devices 102a-102c may be combined into a single unit with the corresponding one of the gateways 106a-106c (e.g., the example data collection device 102a and the example 106a may combined in a single device). The example gateways 106a-106c perform real-time data analysis on the data collected by the example corresponding data collection devices 102a-102c. Additionally, the example gateways 106a-106c send condensed data 108a-108c to an example system manager 110. The example system manager 110 provides rules 112 and/or triggers 114 to the gateways 106a-106c to facilitate the real-time analysis performed by the gateways 106a-106c. The example rules 112 define settings and/or instructions that determine how data is collected by the data collection devices 102a-102c, how data is condensed by the gateways 106a-106c and/or how events are detected by the gateways 106a-106c. The example triggers 114 define instruction(s) to be performed by the data collection devices 102a-102c in response to the gateways 106a-106b and/or the data collection devices 102a-102c detecting an event of interest.

In the illustrated example, the gateways 106a-106c detect events of interest in the data collected by the corresponding data collection devices 102a-102c. The example gateways 106a-106c analyze data collected from the corresponding data collection devices 102a-102c according to the rules 112 provided by the system manager 110 to detect the event(s) of interest. For example, a rule 112 may provide feature points for the gateway 106a-106c to recognize a face of a person of interest from images captured by the data collection device 102a-102c with 80% certainty. As another example, a rule 112 may provide parameters (e.g., speed limits, route location information, acceleration/deceleration thresholds, etc.) for the gateway 106a-106c to determine whether a vehicle having a data collection device 102a-102c is being driven dangerously.

The example gateways 106a-106c demarcate segments of low quality data in the data collected by the data collection devices 102a-102c. Low quality data is data that is unlikely to contain useful information. Examples of low quality data include data that does not change frequently or data that is internally inconsistent. In the illustrated example, the gateways 106a-106c use the rules 112 provided by the system manager to determine which sections of data are low quality. For example, an example one of the rules 112 may state that data collected by a water level sensor is low quality when the level of the water does not change for a period of time. As another example, an example one of the rules 112 may state that data collected by a vehicle monitor is low quality when the measured change in location of the vehicle in not consistent with the measured speed of the vehicle.

In the illustrated example, the gateways 106a-106c generate the condensed data 108a-108c (e.g., locally summarizes data collection by the corresponding data collection devices 102a-102c) based on the rules 112 provided by the system manager 110. The example condensed data 108a-108c contains markers indicating the detected events of interest and/or markers indicating low quality data. In some examples, the gateways 106a-106c include data collected proximate the events of interest (e.g., an amount of time before and an amount of time after the events of interest) and selectively discards data not in proximity to the event of interest and/or that is marked as low quality. In some examples, the gateways 106a-106c decompose the collected data into independent data and dependent data (e.g., data that can be determined and/or estimated using the independent data). In such examples, the condensed data 108a-108c contains the independent data and not the dependent data. In some examples, the system manager 110 supplies, via the rules 112, a method of converting the collected data to fit a Model-Tree generated by the system manager 112. In such examples, the independent attributes in the condensed data 108a-108c are input into the Model-Tree by the system manager 110 to calculate and/or estimate the dependent attributes not included in the condensed data 108a-108c.

The example gateways 106a-106c react to detected events of interest based on triggers 114 provided by the example system manager 110. The example triggers 114 define actions for the gateways 106a-106c to instruct the example data collection devices 102a-102c to take in response to the event of interest detected by the example gateways 106a-106c.

In the illustrated example of FIG. 1, the system manager 110 provides rules 112 and triggers 114 to the gateways 106a-106c in the distributed computing system 100. The example system manager 110 performs real-time analytics to determine actions (e.g., new rules 112 and/or new triggers 114) to follow-up on events of interest detected by the gateways 106a-106c. The example system manager 110 receives condensed data 108a-108c from the gateways 106a-106c. Additionally, the example system manager 110 analyzes the condensed data 110 to select and/or generate the rules 112 and/or triggers 114 to be sent to various gateways 106a-106c. In some examples, the system manager 110 also performs deep analytics to generate the example rules 112 and/or the example triggers 114, validate the condensed data 108a-108c, and/or build models and predictions based on the condensed data 108a-108c. The example system manager 110 balances a level of detail (e.g., level of precision) in data (e.g., the data 210 of FIG. 2) collected by the data collection devices 102a-102c with the amount of bandwidth available to the distributed computing system 100. Depending on the events of interest in the condensed data 108a-108c, the example system manager 110 sends different rules 112 and/or triggers 114 to different ones of the gateways 106a-106c in the distributed computing system 100.

Figure 2:
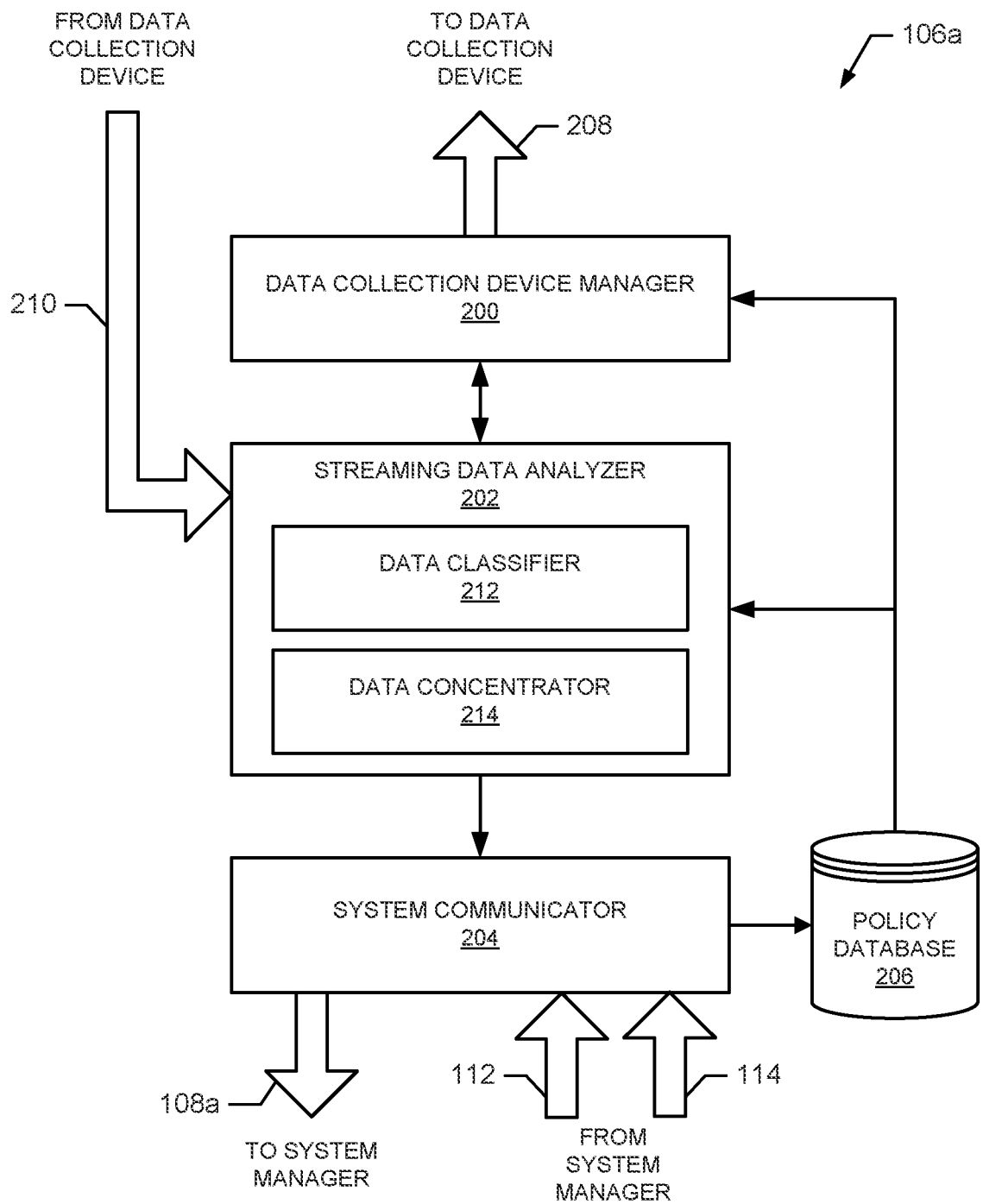
FIG. 2 is a block diagram of an example implementation of the gateway of FIG. 1.

FIG. 2 is a block diagram of an example implementation of the gateway 106a of FIG. 1 to control the example data collection device 102 (FIG. 1) based on rules 112 and triggers 114 provided by the system manager 110 (FIG. 1). In the illustrated example, the gateway 106a includes an example data collection device manager 200, an example streaming data analyzer 202, an example system communicator 204, and an example policy database 206. While example FIG. 2 is described with reference to the example gateway 106a, the implementation illustrated in FIG. 2 may additionally or alternatively be utilized to implement the example gateway 106b and/or the example gateway 106c.

The example policy database 206 of FIG. 2 stores the example rules 112 and/or the example triggers 114 received from the example system manager 110. The example policy database 206 may be any suitable data structure to store the example rules 112 and/or the example triggers 114. In the illustrated example, the policy database 206 supplies the example triggers 114 to the example data collection device manager 200 and/or the example rules 112 to the example streaming data analyzer 202.

The example data collection device manager 200 of FIG. 2 is structured to control the data collection device 102a based on the example rules 112 provided to the example gateway 106a by the example system manager 110. The example data collection device manager 200 is communicatively coupled to the data collection device 102a. In the illustrated example, the data collection device manager 200 sends example command(s) 208 to the example data collection device 102a to control the operation and/or the configuration of the sensors and/or the actuators of the example data collection device 102a. For example, the data collection device manager 200 may control the precision (e.g., resolution, accuracy, etc.) and/or the timing of data 210 collected by the example data collection device 102a. In some examples, the data collection device manager 200 also controls physical aspects of the data collection device 102a, such as an angle and/or a position of the data collection device 102a.

In the illustrated example of FIG. 2, the streaming data analyzer 202 reacts to the data 210 received from the data collection device 102a and concentrates the data 210 to be sent to the example system manager 110. The example streaming data analyzer 202 includes an example data classifier 212 and an example data concentrator 214. The example data classifier 212 detects events of interest in the example data 210 based on the example rule 112 provided by the system manager 110. For example, the rule 112 may include feature points to detect a person of interest (e.g., a criminal suspect, a missing child, etc.) in CCTV camera data. When an event of interest is detected, the example data classifier 212 marks (e.g., sets a flag in) the data 210. In some examples, the data classifier 212 determines whether the example trigger 114 that corresponds to the detected event of interest has been provided by the system manager 110. In such examples, if there is the example trigger 114 stored in the policy database 206 corresponds to the event of interest, the example data collection device manager 200 sends the example command(s) 208 to the data collection device 102a as specified by the trigger 114. For example, the trigger 114 may state that upon detecting a person of interest as defined by the rule 112, the gateway 106a is to instruct the data collection device 102a to increase the resolution at which a camera captures images.

In some examples, the data classifier 212 determines whether there is low quality data in the data 210 received from the data collection device 102a as defined by the example rule(s) 112 in the policy database 206. Low quality data is, for example, data that has a low level of variability (e.g. is not changing, such as video that does not include any motion) and/or data that is internally inconsistent. In some examples, the data 210 contains quality information. For example, the data collection device 102a may have a temperature sensor, and an oxygen sensor that is only accurate over a certain range of temperatures. In such an example, the example rule 112 provided by the system manager 110 may instruct the data classifier 212 to mark the portions of the data 210 as low quality when data from the temperature sensor indicates values outside of the temperature range.

The data concentrator 214 of the illustrated example generates the example condensed data 108a to be sent to the system manager 110. The example data concentrator 214 to receive the example rules 112 from the example system manger 110. The example rules 112 instruct the example data concentrator 214 how to reduce the amount of the data 210 sent to the system manager 110. In the illustrated example, the example data concentrator 214 includes portions of the data 210 pertaining to the detected events of interest in the example condensed data 108a. In some examples, the data concentrator 214 excludes portions of the data 210 that is marked by the data classifier 212 as low quality from the example condensed data 108a. Additionally or alternatively, in some examples, the data concentrator 212 includes in the condensed data 108a the portions of the data 210 that are proximate to detected events of interest (e.g., data 210 representing a period of time before the event of interest and a period of time after an event of interest) and removes the portions of the data 210 that are not proximate detected events of interest. For examples, if a person of interest is detected by the data classifier 212, the data concentrator 214 may include images captured before and after the person of interest was detected.

In some examples, the rules 112 provided by the system manager 110 define categories based on attribute and attribute values in the example data 210 and defines independent attributes for the categories. In some such examples, the data concentrator 214 uses the example rules 112 to assign samples of the data 210 to the categories based on the values of the attributes within the sample of the data 210. For a sample of the example data 210, the data concentrator 214 includes the assigned category and the corresponding independent attributes of the sample in the condensed data 108a and discards the remaining attributes. In some such examples, the data concentrator 214, from time to time (e.g., periodically, aperiodically, etc.), includes the independent attributes and the dependent attributes in the condensed data 108a to allow the system manager 110 to validate the independent attributes.

The example system communicator 204 sends condensed data 108a to the system manager 110, and receives rules 112 and triggers 114 from the system manager 110. In the illustrated example, the system communicator 204 stores the rules 112 and the triggers 114 in the policy database 206. The example system communicator 204 packages the example condensed data 108a generated by the streaming data analyzer 202 into a protocol (e.g., Message Queue Telemetry Transport (MQTT), Hypertext Transfer Protocol (HTTP), HTTP Secure (HTTPS), Constrained Application Protocol (CoAP), etc.) used to communicate between the example gateway 106a and the example system manager 110 and transmits the packaged condensed data 108a to the example system manager 110.

In operation, the example streaming data analyzer 202 receives the data 210 from the example data collection device 102a. Based on the example rules 112 and/or the triggers 114 in the example policy database 206, the example streaming data analyzer 202 generates condensed data 108a. In the illustrated example, the streaming data analyzer 202 sends responses to the triggers 114 to the example data collection device manager 200. The example streaming data analyzer 202 also sends the condensed data 108a to the example system communicator 204. The example system operator 204 transmits the condensed data 108a to the system manager 110. Additionally, the system communicator 204 stores the rules 112 and/or the triggers 114 received from the example system manager 110 FIG. 1) in the policy database 206. The example data collection device manager 200 sends example command(s) 208 to the example data collection device 102a based on the responses sent by the example streaming data analyzer 202.

While an example manner of implementing the gateway 106a of FIG. 1 is illustrated in FIG. 2, one or more of the elements, processes and/or devices illustrated in FIG. 2 may be combined, divided, re-arranged, omitted, eliminated and/or implemented in any other way. Further, the example data collection device manager 200, the example streaming data analyzer 202, the example system communicator 204 and/or, more generally, the example gateway 106a of FIG. 2 may be implemented by hardware, software, firmware and/or any combination of hardware, software and/or firmware. Thus, for example, any of the example data collection device manager 200, the example streaming data analyzer 202, the example system communicator 204 and/or, more generally, the example gateway 106a could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collection device manager 200, the example streaming data analyzer 202, and/or the example system communicator 204 is/are hereby expressly defined to include a tangible computer readable storage device or storage disk such as a memory, a digital versatile disk (DVD), a compact disk (CD), a Blu-ray disk, etc. storing the software and/or firmware. Further still, the example gateway 106a of FIG. 1 may include one or more elements, processes and/or devices in addition to, or instead of, those illustrated in FIG. 2, and/or may include more than one of any or all of the illustrated elements, processes and devices.

Figure 3:
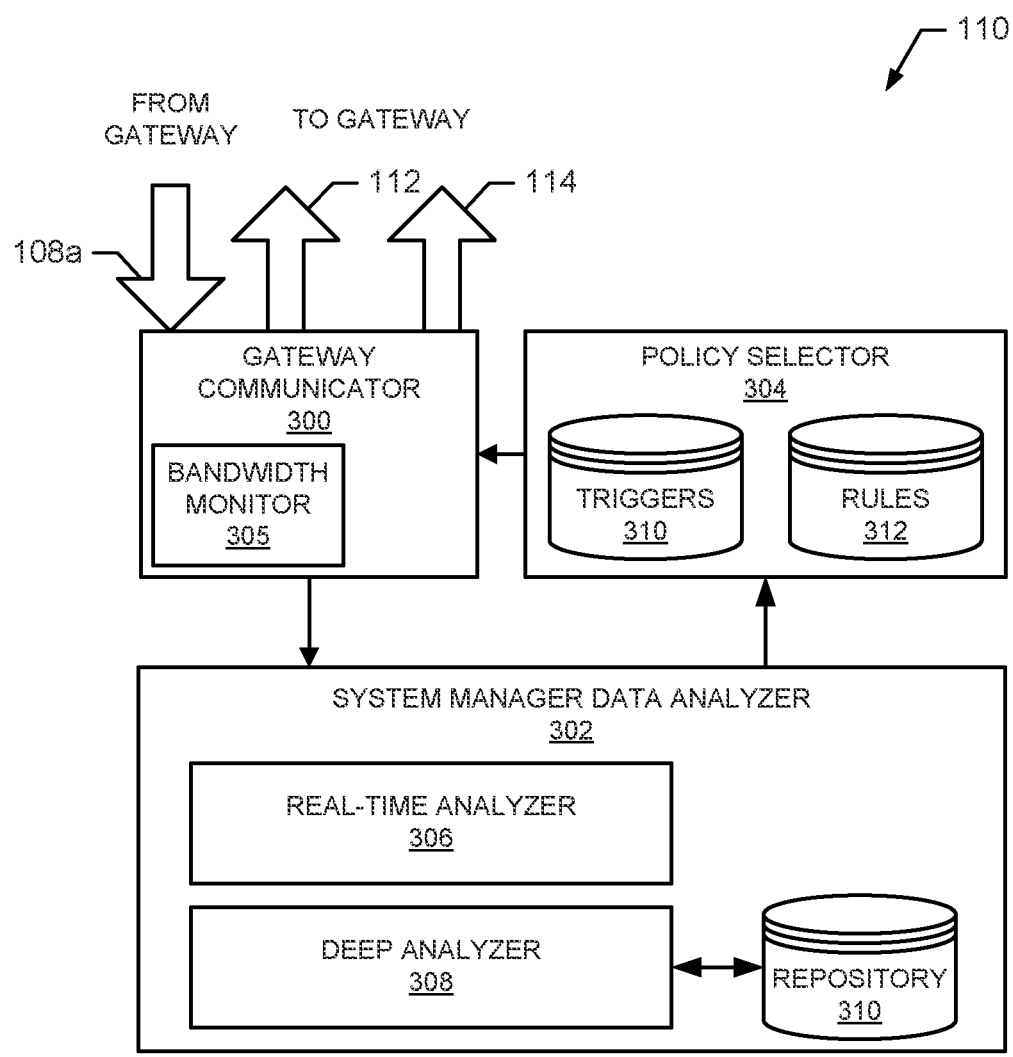
FIG. 3 is a block diagram of an example implementation of the system manager of FIG. 1.

FIG. 3 illustrates an example implementation of the system manager 110 of FIG. 1 that adaptively provides rules 112 and triggers 114 to gateways 106a-106c to manage data collection devices 102a-102c in the distributed computing system 100. In the illustrated example, the system manager 110 includes an example gateway communicator 300, an example system manager data analyzer 302, and an example policy selector 304.

The example gateway communicator 300 of FIG. 3 receives the example condensed data 108a-108c from the example gateways 106a-106c in the distributed computing system. The example gateway communicator 300 also receives the example rules 112 and/or the example triggers 114 from the policy selector 304 for sending to one or more of the example gateways 106a-106c specified by the policy selector 304. In the illustrated example, the gateway communicator 300 packages the example rules 112 and/or the example triggers 114 into a protocol (e.g., Message Queue Telemetry Transport (MQTT), Hypertext Transfer Protocol (HTTP), HTTP Secure (HTTPS), Constrained Application Protocol (CoAP), etc.) used to communicate between the example system manager 110 and the example gateways 106a-106c and transmits the packaged the example rules 112 and/or the example triggers 114 to the example gateways 106a-106c.

In the illustrated example, the gateway communicator 300 of FIG. 3 includes a bandwidth monitor 305 to monitor the bandwidth (e.g., bit rate per second) that the example gateways 106a-106c use to send the example condensed data 108a-108c to the example system manager 110. For example, a gateway 106a may consume bandwidth of 1000 kilobits per second (kbps) when sending the condensed data 108 to the system manager 110. In some examples, the example bandwidth monitor 305 sends an alert to the example system manager data analyzer 302 if the bandwidth consumed by the example gateways 106a-106c is near (e.g., within 10%, within 20%, etc.) a bandwidth capacity of the distributed computing system 100.

In the illustrated example of FIG. 3, the system manager data analyzer 302 analyzes the condensed data 108a-108c from the example gateways 106a-106c to organize data collected by the example data collection devices 102a-102c, determine actions based on events of interest detected by the gateways 106a-106c, and/or manage the amount of data being sent from the example gateways 106a-106c, etc. The example system manager data analyzer 302 includes an example real-timer analyzer 306, an example deep analyzer 308, and an example data repository 310.

The example real-time analyzer 306 filters and aggregates the example condensed data 108a-108c received from the example gateways 106a-106c to provide the aggregated data to the deep analyzer 308 for further analysis and to determine distributed computing system-wide responses to events of interest marked in the condensed data 108a-108c. In the illustrated example, the real-time analyzer 306 determines which of the example rules 112 and/or the example triggers 114 are to be sent to which gateways 106a-106c. The example real-time analyzer 306 balances the example instructing data collection devices 102a-102c (via the gateways 106a-106c) to collect more detailed data with the bandwidth available in the distributed computing system 100.

In some examples, in response to an event of interesting being detected by a particular one of the gateways 106a-106c, the real-time analyzer 306 determines that some of the gateways 106a-106c are to increase the amount of data sent to the system manager 110. In some such examples, the determination is based on factors such as geographical proximity to the particular one of the gateways 106a-106c that detected the event of interest, geographical proximity to a particular one of the data collection devices 102a-102c that captured that data 210 (FIG. 2) containing the event of interest, priority of the data collection devices 102a-102c, criticality of the data collection devices 102a-102c, etc. For example, in response to a particular one of the example gateways 106a-106c detecting a person of interest, the real-time analyzer 306 may determine that the gateways 106a-106c geographically proximate to the particular one of the gateways 106a-106c are to instruct the data collection devices 102a-102c (e.g., CCTV cameras) corresponding to particular ones of the gateways 106a-106c to increase their image capture resolution (e.g., from 640×480 resolution to 1280×720 resolution, etc.) and to increase the frequency of data collection (e.g., capturing an image every second instead of every five seconds, etc.). In some such examples, to balance the bandwidth used in the distributed computing system 100, the real-time analyzer 306 may determine that other ones of the example gateways 106a-106c are to decrease the amount of data sent to the system manager 110. For example, the real-time analyzer 306 may determine that the ones of the gateways 106a-106c that are not geographically proximate to the particular one of the gateways 106a-106c are to instruct their corresponding data collection devices 102a-102c (e.g., CCTV cameras) to decrease their image capture resolution (e.g., from 640×480 resolution to 352×240 resolution, etc.) and to decrease the frequency of data collection (e.g., capturing an image every ten seconds instead of every five seconds, etc.).

The example deep analyzer 308 performs deep analytics on the data aggregated by the real-time analyzer 306 to generate and/or modify the rules 112 and/or the triggers 114 that are sent to the example gateways 106a-106c. The deep analytics include, for example, data mining, machine learning, data modeling, and data organization. In some examples, the example deep analyzer 308 generates the rules 112 to balance amount of the data 210 included in the condensed data 108a-108c with the accuracy of the condensed data 108a-108c. Additionally, in some examples, the example deep analyzer 308 generates the rules 112 that dictate how the data collection devices 102a-102c collect the data 210, and the rules 112 that dictate how the gateways 106a-106c generate the condensed data 108a-108c.

In some examples, to generate the rules 112 regarding how the gateways 106a-106c generate the condensed data 108a-108c, the deep analyzer 308 performs model tree clustering analysis on the aggregated data stored in the data repository 310. To perform model tree clustering analysis, the example deep analyzer 308 first performs clustering analysis using techniques such as K-means clustering, or expectation-maximization clustering, etc. to identify clusters/categories for the aggregated data. In such examples, the clustering analysis identifies attributes and attribute values in the data 210 that cause a particular sample to fit within a category. Then, for the categories identified by the clustering analysis, the example deep analyzer 308 identifies the independent attributes from within the attributes. In the illustrated example, the independent attributes are attributes that are not calculable or estimable using other attributes and may be used to calculate the other attributes. Then, the example deep analyzer 308 constructs a model tree for each category based on the independent attributes identified for the respective category. Example approaches for constructing a model tree are described by Frank et al., "Using Model Trees for Classification." Machine Learning 32.1 (1998): 63-76, which is hereby incorporated herein by reference. The example deep analyzer 308 generates the example rule 112 that instructs the example gateways 106a-106c on how to categorize the example data 210 from the example data collection devices 102a-102c based on the clustering analysis. The example rule 112 also instructs on which attributes to include in the example condensed data 108a-108c based on the assigned category. The example deep analyzer 308 stores the model tree in the example data repository 310 to allow for reconstruction of the data 210 from the condensed data 108a-108c by the example deep analyzer 308.

In some examples, the deep analyzer 308 analyzes the aggregated data in the data repository 310 to detect attributes that are indicative and/or predictive of events of interest. For example, in a commercial vehicle monitoring system, the deep analyzer 308 may determine that predictive attributes (and values) of a driver falling asleep include time of day (e.g., between 1:00 am and 6:00 am), speed (e.g., more than 15 miles an hour below the speed limit), and driving time (e.g., greater than six hours). In some such examples, the deep analyzer 308 generates the rule 112 to detect an event of interest (e.g., a driver falling asleep) based on the predictive attributes.

In the illustrated example of FIG. 3, the policy selector 304 selects the rules 112 and/or the triggers 114 to send to the example gateways 106a-106c based on instructions received from the example system manager data analyzer 302. The example policy selector 304 includes an example trigger database 310 and an example rules database 312. The example trigger database 310 contains triggers 114 defined by the system manager data analyzer 302 and/or an administrator of the distributed computing system 100. The example rules database 312 contains rules 112 defined by the system manager data analyzer 302 and/or the administrator of the distributed computing system 100. The example rules database 312 and/or the example trigger database 310 may be a relational database, a file, a collection of files, or any other suitable data structure to manage and/or store files. In some examples, the example rules database 312 and the example trigger database 310 may be combined into one database.

In some examples, the system manager data analyzer 302 specifies a specific rule 112 and/or trigger 114 to be sent to one or more gateways. Alternatively or additionally, in some examples, the system manager data analyzer 302 specifies a result, and the policy selector 204 selects a rule 112 and/or a trigger that meets the specified result. For example, the system manager data analyzer 302 may specify that a particular gateway 106a-106c connected to a CCTV camera is to collect higher quality data. In such an example, the policy selector 304 selects a rule 112 from the rule database 312 that causes the CCTV camera to capture higher resolution images.

In operation, the example gateway communicator 300 receives condensed data 108a-108c from the gateways 106a-106c in the distributed computing system 100. In the illustrated example of FIG. 3, the example gateway communicator 300 sends the condensed date 108a-108c to the example system manager data analyzer 302. The example system manager data analyzer 302 analyzes the condensed data 108a-108c and indicates to the example policy selector 304 which of the example rules 112 and/or which of the example triggers 114 are to be send to which of the example gateways 106a-106c. The example policy selector 304 communicates the selected rules 112 and/or the selected triggers 114, and the target gateway(s) 106a-106c to the example gateway communicator 300. The example gateway communicator 300 transmits the selected rules 112 and/or the selected triggers 114 to the gateways 106a-106c indicated by the system manager data analyzer 302.

While an example manner of implementing the system manager 110 of FIG. 1 is illustrated in FIG. 3, one or more of the elements, processes and/or devices illustrated in FIG. 3 may be combined, divided, re-arranged, omitted, eliminated and/or implemented in any other way. Further, the example gateway communicator 300, the example system manager data analyzer 302, the example policy selector 304 and/or, more generally, the example system manager 110 of FIG. 3 may be implemented by hardware, software, firmware and/or any combination of hardware, software and/or firmware. Thus, for example, any of the example gateway communicator 300, the example system manager data analyzer 302, the example policy selector 304 and/or, more generally, the example system manager 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example gateway communicator 300, the example system manager data analyzer 302, the example policy selector 304 is/are hereby expressly defined to include a tangible computer readable storage device or storage disk such as a memory, a digital versatile disk (DVD), a compact disk (CD), a Blu-ray disk, etc. storing the software and/or firmware. Further still, the example system manager 110 of FIG. 1 may include one or more elements, processes and/or devices in addition to, or instead of, those illustrated in FIG. 3, and/or may include more than one of any or all of the illustrated elements, processes and devices.

Figure 4:
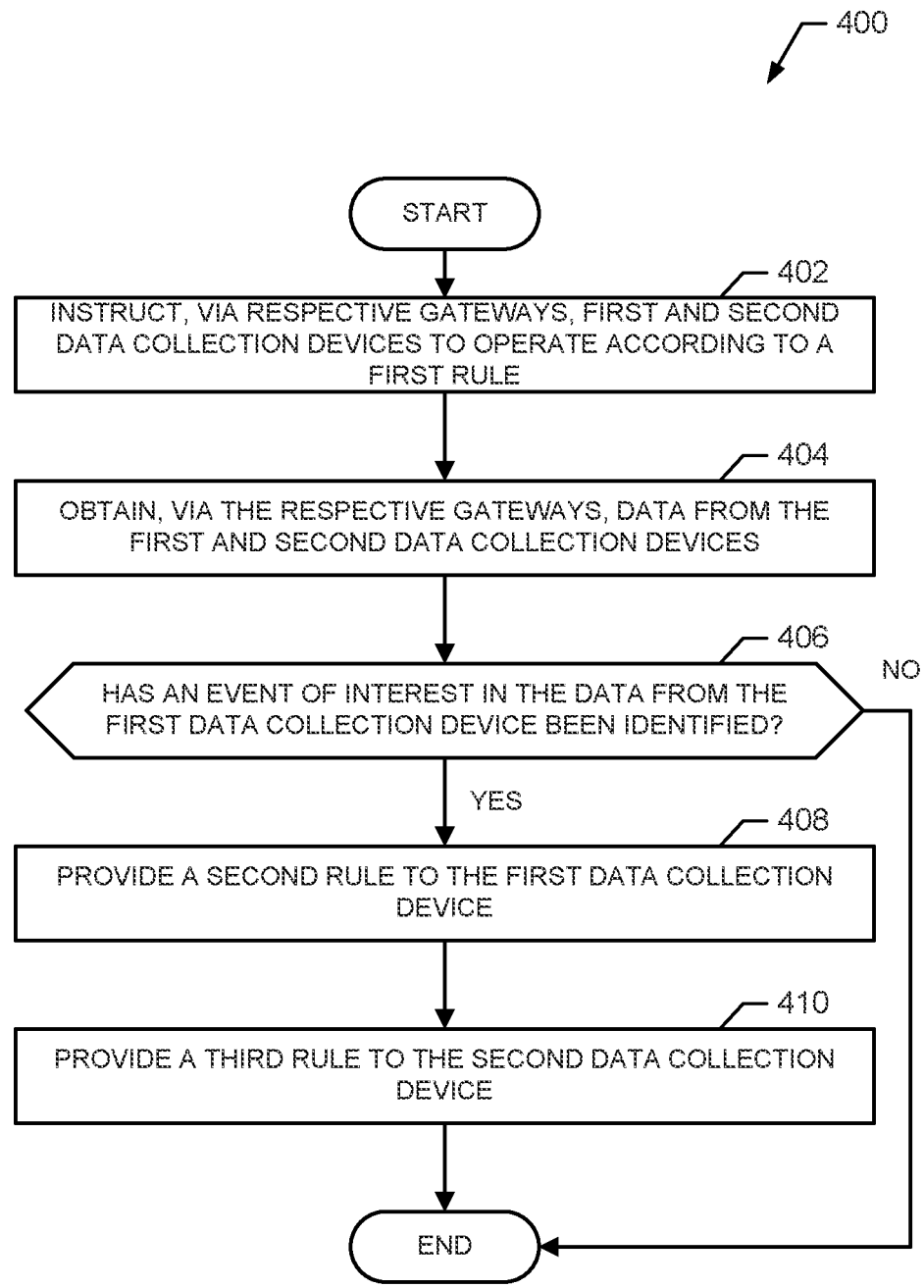
FIG. 4 is a flow diagram representative of example machine readable instructions that may be executed to implement the example system manager of FIGS. 1 and/or 3 to adaptively manage the example distributed computing system of FIG. 1.
Figure 5:
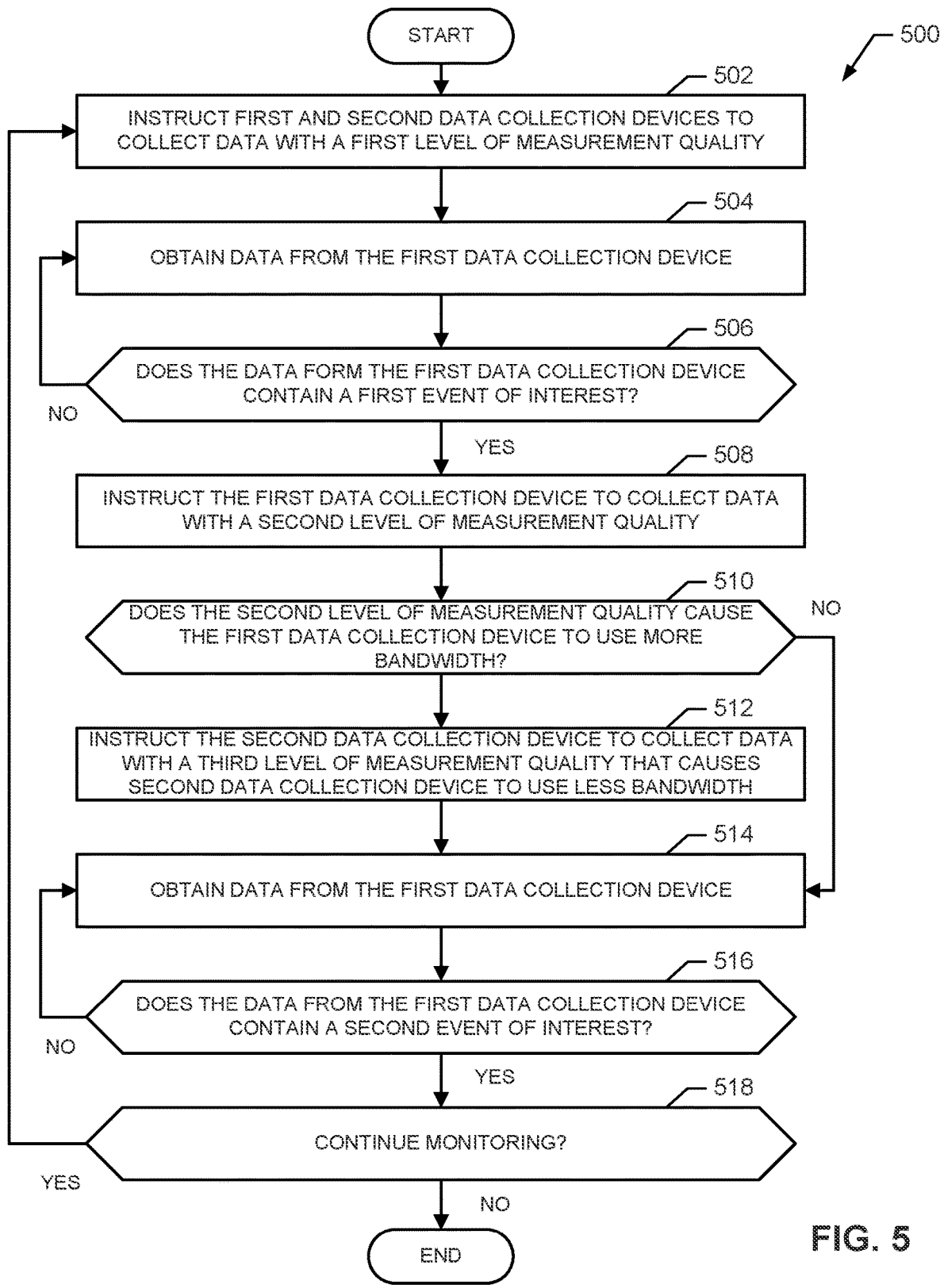
FIG. 5 is a is a flow diagram representative of example machine readable instructions that may be executed to implement the example system manager of FIGS. 1 and/or 3 to manage bandwidth used by the example distributed computing system of FIG. 1.
Figure 6:
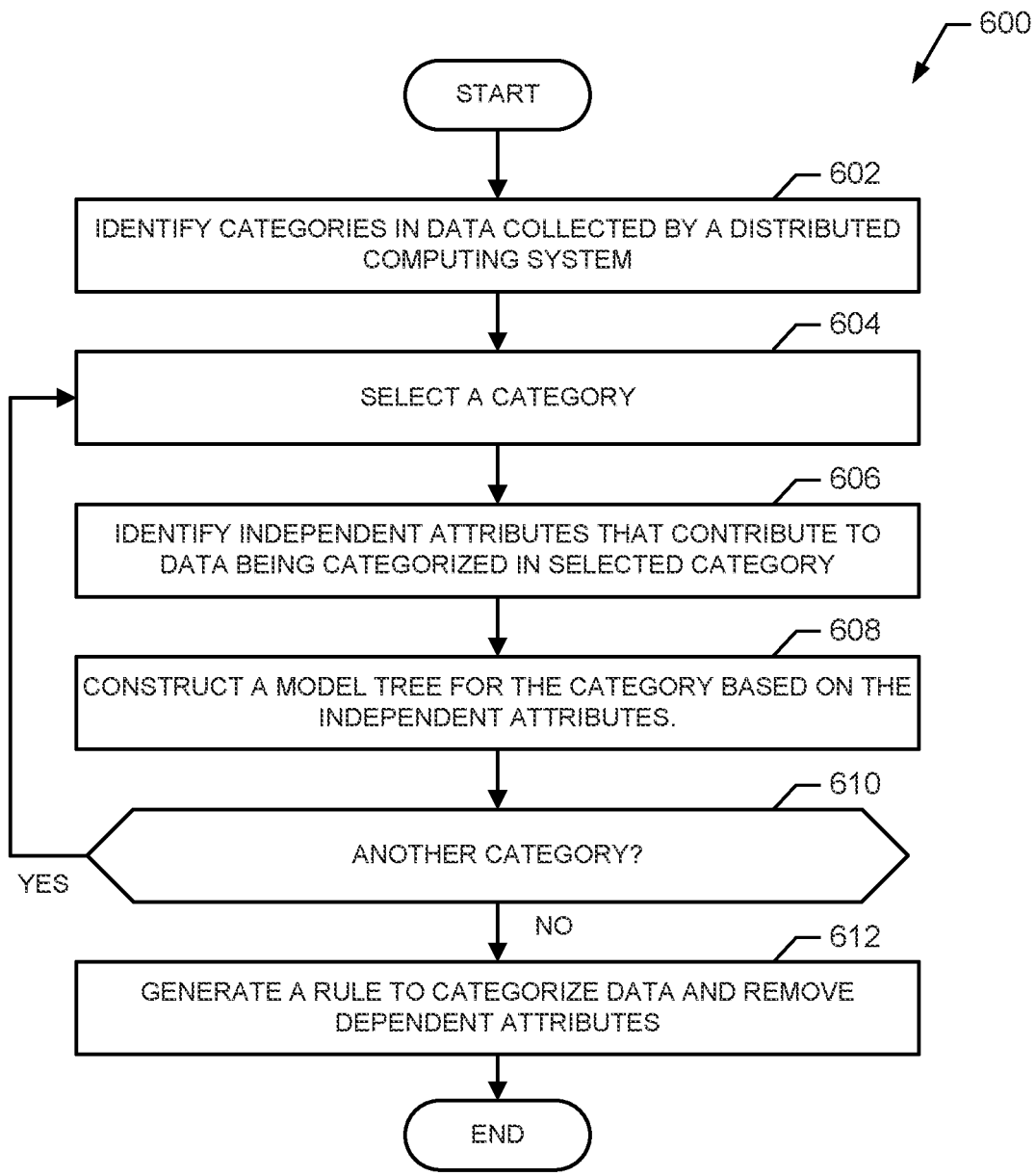
FIG. 6 is a is a flow diagram representative of example machine readable instructions that may be executed to implement the example system manager of FIGS. 1 and/or 3 to generate a rule for condensing data.

Flowcharts representative of example machine readable instructions for implementing the example system manager 110 of FIGS. 1 and/or 3 are shown in FIGS. 4, 5, and 6. In these examples, the machine readable instructions comprise programs for execution by a processor such as the processor 912 shown in the example processor platform 900 discussed below in connection with FIG. 9. The programs may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 4, 5, and 6, many other methods of implementing the example system manager 110 may alternatively be used. For example, the order of execution of the blocks may be changed, and/or some of the blocks described may be changed, eliminated, or combined.

As mentioned above, the example processes of FIGS. 4, 5, and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4, 5, and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is a flow diagram representative of example machine readable instructions 400 that may be executed to implement the example system manager 110 of FIGS. 1 and/or 3 to adaptively manage the example distributed computing system 110 of FIG. 1. Initially, the example policy selector 304 (FIG. 3) instructs, via the example respective gateways 106a, 106b (FIGS. 1 and 2), an example first data collection device 102a (FIG. 1) and an example second data collect device 102b in the example distributed computing system 100 to operate according to a first rule (block 402). The example first rule specifies a first operating mode and defines a first event of interest. In some examples, the first operating mode defines a level of measurement quality at which the first data collection device 102a and the second data collection device 102b are to collect data and/or defines the frequency at which the first data collection device 102a and the second data collection device 102b are to collect data. The example gateway communicator 300 (FIG. 3) receives or otherwise obtains, via the example respective gateways 106a, 106b, the data 210 (FIG. 2) from the example first data collection device 102a and the example second data collection device 102b (block 404).

The example system manager analyzer 302 determines whether an event of interest has been identified in the data 210 from the example first data collection device 102a (block 406). If an event of interest has been identified in the data 210 from the example first data collection device 102a, the example policy selector 304 provides a second rule to the example first data collection device 102a via an example first example gateway 106a (block 408). In some examples, the second rule defines a level of measurement quality and/or defines a data collection frequency that is greater than the first rule. Additionally, if an event of interest has been identified in the data from the example first data collection device 102a, the example policy selector 304 provides a third rule to the example second data collection device 102b that is different from the first rule and/or the second rule via an example second gateway 106a (block 410). In some examples, the third rule defines a level of measurement quality and/or defines a data collection frequency that is less than the first rules and the second rule. The example program 400 then ends.

FIG. 5 is a is a flow diagram representative of example machine readable instructions 500 that may be executed to implement the example system manager 110 of FIGS. 1 and/or 3 to manage bandwidth used by the example distributed computing system 100 of FIG. 1. Initially, the example policy selector 304 (FIG. 3) instructs, via respective example gateways 106a, 106b (FIGS. 1 and 2), an example first data collection device 102a (FIG. 1) and an example second data collect device 102b in the example distributed computing system 100 to operate according to a first one of the rules 112 (block 502). The example first one of the rules 112 specifies a first operating mode and defines a first event of interest. In some examples, the first operating mode defines a first level of measurement quality at which the first data collection device 102a and the second data collection device 102b are to collect data and/or defines the frequency at which the first data collection device 102a and the second data collection device 102b are to collect data.

The example gateway communicator 300 (FIG. 3) receives or otherwise obtains, via the example respective gateways 106a, 106b, the data 210 (FIG. 2) from the example first data collection device 102a and the example second data collection device 102b (block 504). The example system manager data analyzer 304 determines whether the data 210 from the example first data collection device 102a contains a first event of interest (block 506). If the data 210 from the example first data collection device 102a does not contain the first event of interest, the example gateway communicator 300 continues to receive or otherwise obtain data from the example first data collection device 102a (block 504).

If the data 210 from the example first data collection device 102a contains the first event of interest, the example policy selector 304 instructs, via the example respective gateway 106a, the example first data collection device 102a to collect data according to a second level of measurement quality (block 508). In some examples, the second level of measurement quality is greater than the first level of measurement quality. For example, the second level of measurement quality may increase the frequency that the first data collection device 102a captures the data 210. The example gateway communicator 300 determines whether the second level of measurement quality causes the example first data collection device 102a to use more bandwidth than the first level of measurement quality (block 510). If the second level of measurement quality causes the example first data collection device 102a to use more bandwidth than the first level of measurement quality, the example policy selector 304 instructs, via the example respective gateway 106b, the example second data collection device 102b to collect data with a third level of measurement quality that causes the example second data collection device 102b to use less bandwidth (block 512). For example, the third level of measurement quality may reduce the frequency that the second data collection device 102b capture the data 210. Alternatively, in some examples, the example policy selector 304 instructs, via the example respective gateway 106b, the example second data collection device 102b to collect data with a third level of measurement quality without determining whether more bandwidth is used as a result of the first data collection device 102a operating according to the second rule.

Then, the example gateway communicator 300 receives or otherwise obtains the example data 210 from the example first data collection device 102a (block 514). The example system manager data analyzer 302 determines whether the data 210 from the example first data collection device 102a contains a second event of interest (block 516). If the data from the example first data collection device 102a does not contain the second event of interest, the example gateway communicator 300 continues to receive or otherwise obtain data from the first data collection device 102a (block 514).

If the data from the example first data collection device 102a contains the second event of interest (block 516), the example system manager data analyzer 302 determines whether to continue to monitor the data collection devices 102a, 102b (block 518). If the example system manager data analyzer 302 determines to continue to monitor the data collection devices 102a, 102b, the example policy selector 304 (FIG. 3) instructs, via the respective example gateways 106a, 106b, the example first data collection device 102a and the example second data collect device 102b in the example distributed computing system 100 to operate according to the first rule (e.g., or any other suitable rule) (block 502). Otherwise, the example program 500 ends.

While FIG. 5 is described with reference to the example first data collection device 102a, the example first gateway 106a, the example second data collection device 102b, and the example second gateway 106b, the instructions illustrated in FIG. 5 may additionally or alternatively utilize operate in conjunction with ones of the example gateways 106a-106c and/or any ones of the example data collection devices 102a-102c in the example distributed computing system 100.

FIG. 6 is a flow diagram representative of example machine readable instructions 600 that may be executed to implement the example system manager 110 of FIGS. 1 and/or 3 to generate the example rule 112 (FIGS. 1 and/or 2) for condensing the example data 210 (FIG. 2). The example deep analyzer 308 (FIG. 3) identifies categories in the data 210 collected by the data collection devices 102a-102c in the distributed computing system 100 (block 602). In some examples, the data 210 is stored in the data repository 310 (FIG. 3). In some examples, the example deep analyzer 308 uses clustering analysis (e.g., k-means analysis, expectation-maximization analysis, etc.) to identify the clusters/categories. The example deep analyzer 300 selects one of the categories identified at block 602 (block 604). The example deep analyzer 300 identifies independent attributes and corresponding attribute values within the data 210 that contribute to the data being categorized in the selected category (block 606). The example deep analyzer 300 constructs a model-tree for the selected category based on the independent attributes identified at block 606 (block 608).

The example deep analyzer 300 determines whether there is another category to analyze (block 610). If there is another category to analyze, the deep analyzer 300 selects the next category (block 604). Otherwise, the example deep analyzer 300 generates the example rule 112 that instructs a gateway (e.g., the example gateways 106a-106c) to categorize data collected by the corresponding data collection devices (e.g., the example data collection devices 102a-102c), and to remove non-independent attributes from the collected data (block 612). The example program 600 then ends.

Figure 7:
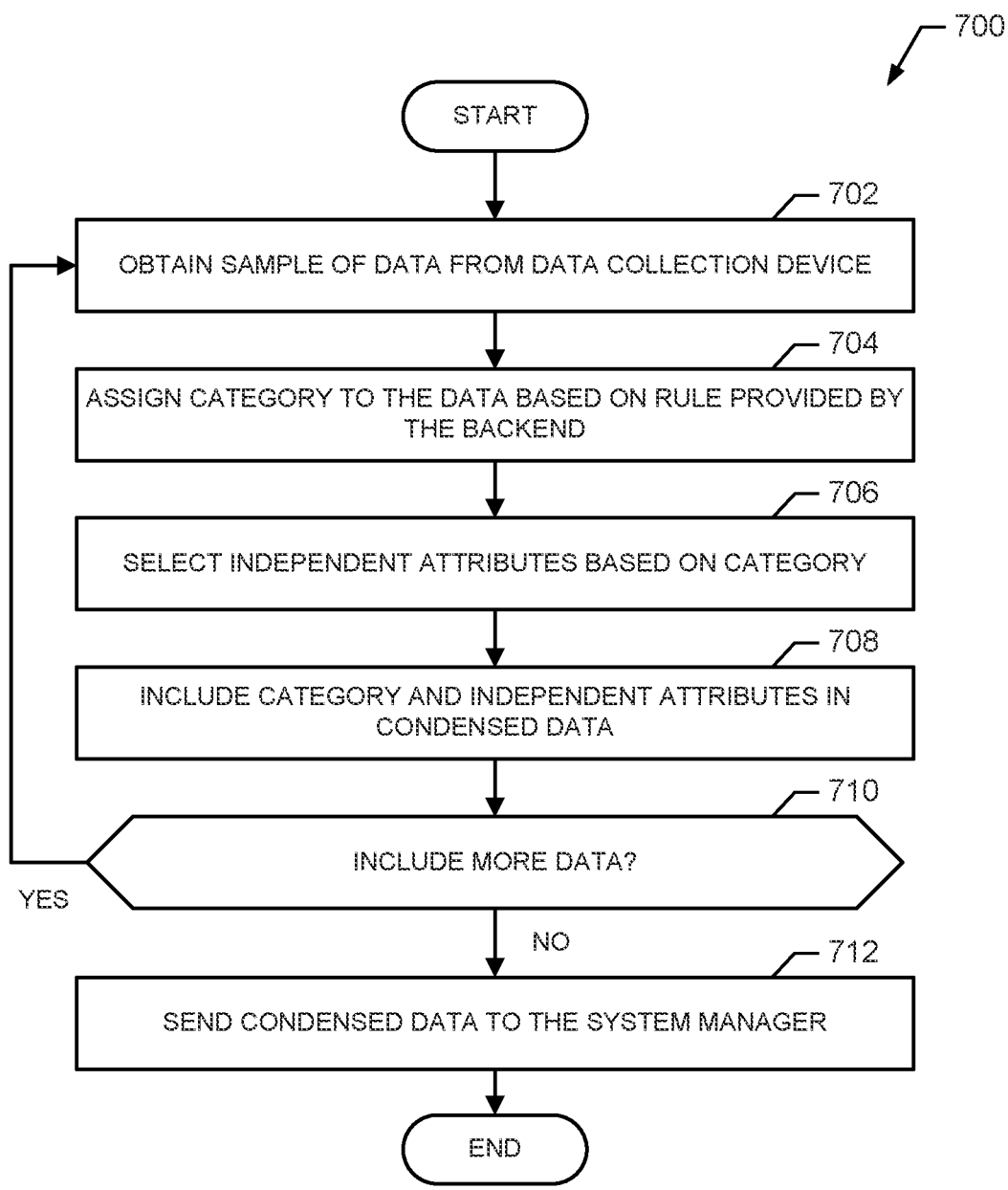
FIG. 7 is a flow diagram representative of example machine readable instructions that may be executed to implement the example gateway of FIGS. 1 and/or 2 to condense data based on a rule generated by the system manager of FIGS. 1 and/or 3.
Figure 8:
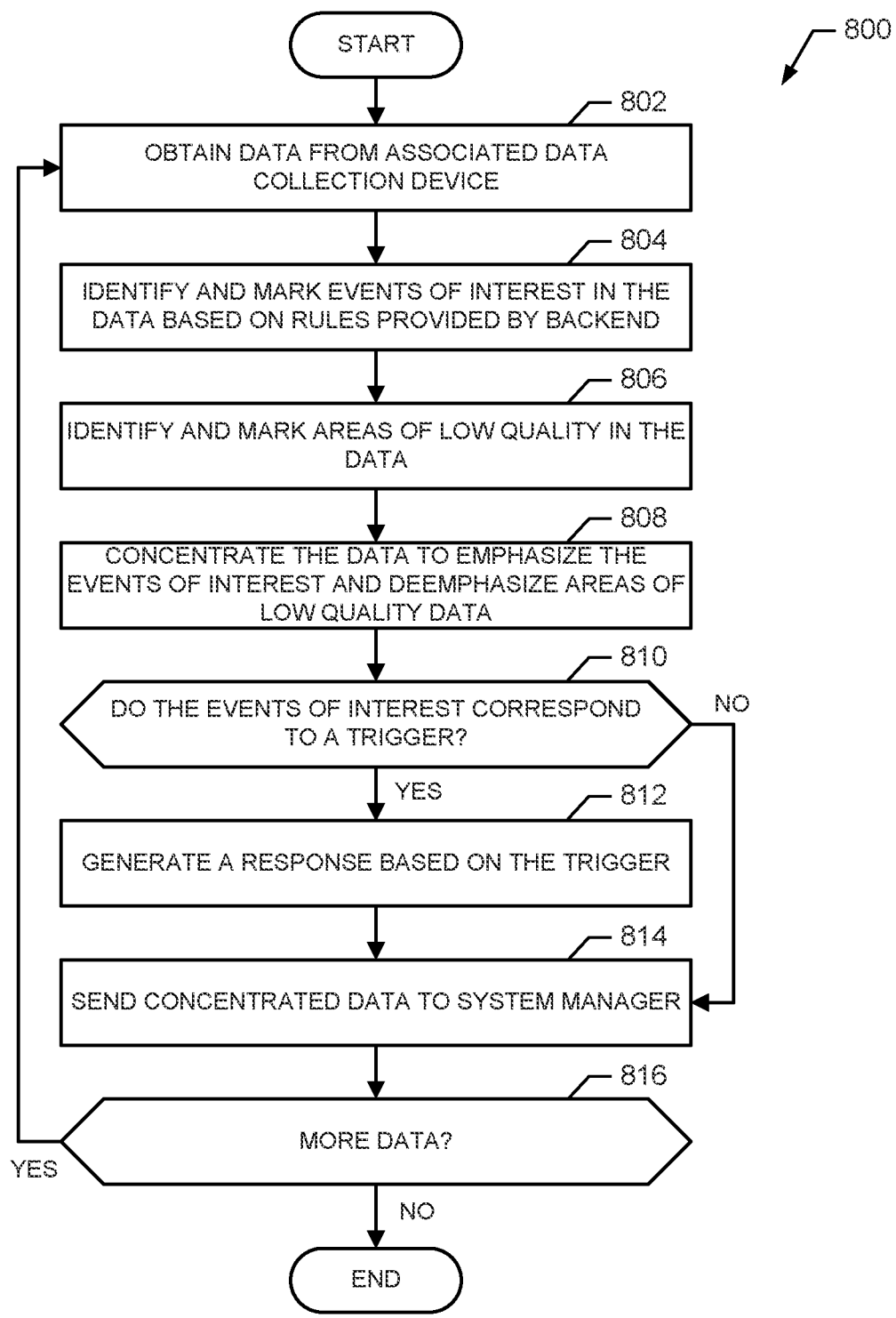
FIG. 8 is a flow diagram representative of example machine readable instructions that may be executed to implement the example gateway of FIGS. 1 and/or 2 to detect and respond to events of interest.

Flowcharts representative of example machine readable instructions for implementing the example gateways 106a-106c of FIGS. 1 and/or 2 are shown in FIGS. 7 and 8. In these examples, the machine readable instructions comprise programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 7, and 8, many other methods of implementing the example gateways 106a-106c may alternatively be used. For example, the order of execution of the blocks may be changed, and/or some of the blocks described may be changed, eliminated, or combined.

As mentioned above, the example processes of FIGS. 7 and 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7 and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 7 is a flow diagram representative of example machine readable instructions 700 that may be executed to implement the example gateway 106a of FIGS. 1 and/or 2 to condense data 210 (FIG. 2) based on the example rule 112 (FIGS. 1 and/or 2) generated by the system manager 110 of FIGS. 1 and/or 3. Initially, the example data collection device manager 200 (FIG. 2) receives or otherwise obtains a sample of the data 210 from the example data collection device 102a communicatively coupled to the gateway 106a (block 702). The example data concentrator 214 assigns the sample of the data 210 to a category based on the example rule 112 provided by the example system manager 110 (block 704). The example data concentrator 214 selects the independent attributes from the sample of the data 210 based on the category assigned at block 704 (block 706).

The example data concentrator 214 adds the category assigned at block 704 and the independent attributes selected at block 706 in condensed data 108a (FIGS. 1, 2, and/or 3) (block 708). The example data concentrator 214 determines whether to include more samples of the data 210 in the condensed data 108a (block 710). For example, the gateway 106a may send the condensed data 108a to the system manager periodically (e.g., every five seconds, every ten seconds, etc.) and/or aperiodically (e.g., after accumulating a certain amount of the condensed data 108a, when an event of interest is detected, etc.). If more samples of the data 210 are to be included, the data collection device manager 200 receives or otherwise obtains a sample of data 210 from the data collection device 102a (block 702). Otherwise, the system communicator 204 sends the condensed data 108a to the system manager 110 (block 712). Example program 700 then ends.

While FIG. 7 is described with reference to the example data collection device 102a and the example gateway 106a, the instructions illustrated in FIG. 7 may additionally or alternatively operate in conjunction with any ones of the gateways 106a-106c and/or any ones of the data collection devices 102a-102c in the example distributed computing system 100.

FIG. 8 is a flow diagram representative of example machine readable instructions 800 that may be executed to implement the example gateway(s) 106a of FIGS. 1 and/or 2 to detect and respond to events of interest. Initially, the example data collection device manager 200 (FIG. 2) obtains the data 210 (FIG. 2) from the example data collection device 102a (FIG. 1) communicatively coupled to the example gateway 106a (block 802). The example data classifier 212 (FIG. 2) identifies and marks events of interest in the data 210 based on the example rules 112 (FIGS. 1, 2, and/or 3) provided by the example system manager 110 (block 804). Additionally, the example data classifier 212 identifies areas of low quality in the example data 210 (block 806). The example data concentrator 214 (FIG. 2) concentrates the data 210 to emphasize the events of interest detected at block 804 and deemphasize areas of low quality data identified at block 806 (block 808). For example, the data concentrator 214 may include portions of the data 210 temporally proximate the detected event of interest in the condensed data 108a, and may exclude portions of the data 210 determined to be low quality.

The example data classifier 212 determines whether the events of interest detected at block 804 correspond to one of the example triggers 114 (FIGS. 1, 2, and 3) stored in the example policy database 206 (FIG. 2) (block 810). If the detected the events of interest match one of the example triggers 114, the data classifier 212 generates a response based on the one of the example triggers 114 (block 812). For example, in a gunfire detection system, upon detecting gunfire (e.g., an event of interest), the data classifier 212 may direct the data collection device 102a to activate a strobe light. The example system communicator 204 sends the condensed data 108a to the example system manager 110 (block 814). The example data collection device manager 200 determines whether more of the data 210 is to be collected (block 816). If more of the data 210 is to be collected, the example data collection device obtains the data 210 from the data collection device 102a (block 802). Otherwise, the example program 800 then ends. While FIG. 8 is described with reference to the example gateway 106a, the instructions illustrated in FIG. 8 may additionally or alternatively operate in conjunction with any ones of the example gateways 106a-106c in the example distributed computing system 100.

Figure 9:
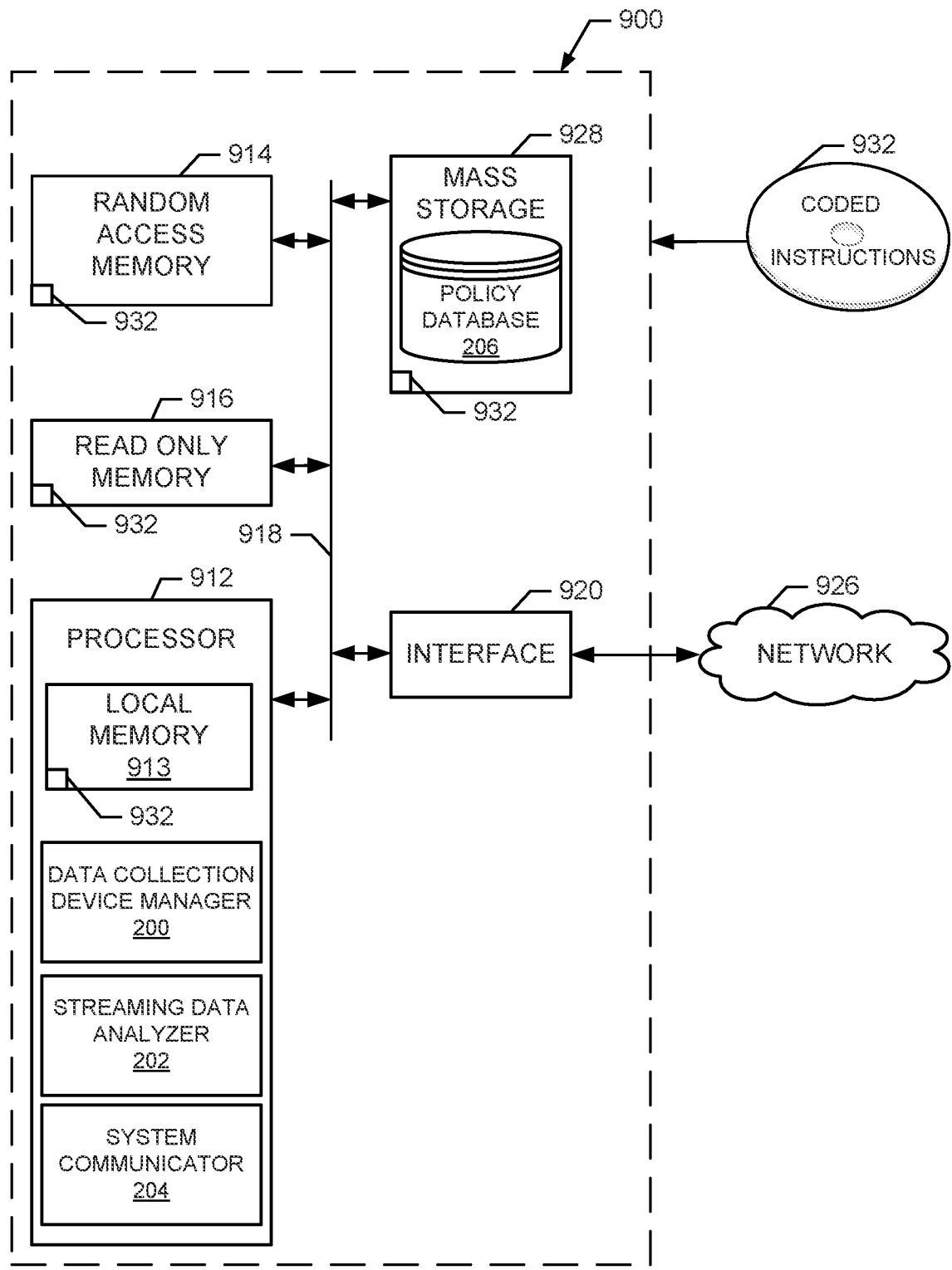
FIG. 9 is a block diagram of an example processor system structured to execute the example machine readable instructions represented by FIGS. 7 and/or 8 to implement the example gateway of FIGS. 1 and/or 2.

FIG. 9 is a block diagram of an example processor platform 900 is structured to execute the instructions 700, 800 of FIGS. 7 and 8 to implement the example gateways 106a-106c of FIGS. 1 and 2. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In the illustrated example, the processor 912 includes the example data collection manager 200, the example streaming data analyzer 202, and the example system communicator 204.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, RAID systems, solid-state drives, etc. In the illustrated example, the mass storage device 928 includes the example policy database 206 to store the example rules 112 (FIGS. 1, 2, and 3) and/or the example triggers 114 (FIGS. 1, 2, and 3).

Coded instructions 932 of FIGS. 7 and/or 8 may be stored in the mass storage device 928, in the volatile memory 914, in the non-volatile memory 916, and/or on a removable tangible computer readable storage medium such as a CD or DVD.

Figure 10:
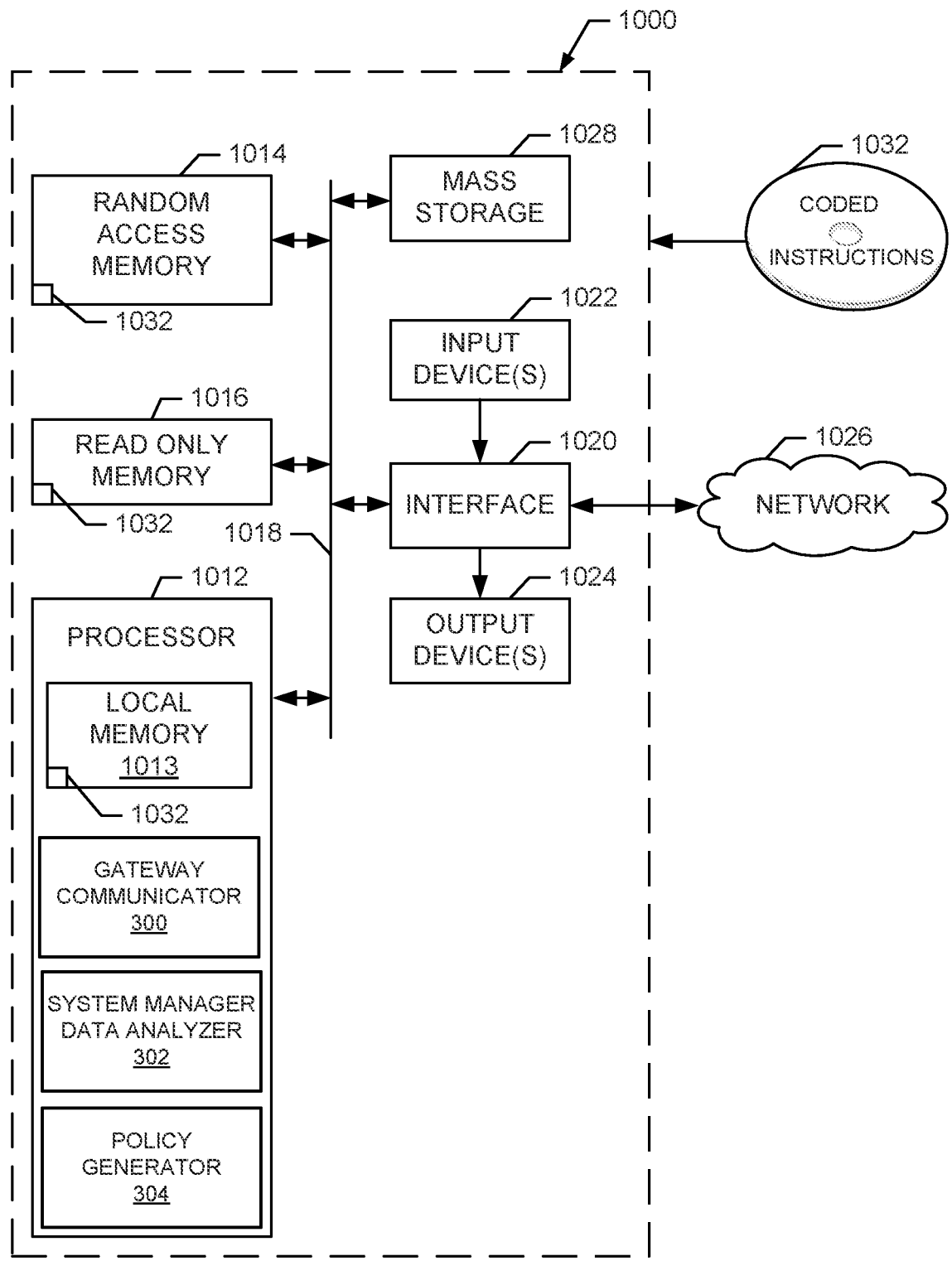
FIG. 10 is a block diagram of an example processor system structured to execute the example machine readable instructions represented by FIGS. 4, 5, and/or 6 to implement the example system manager of FIGS. 1 and/or 3.

FIG. 10 is a block diagram of an example processor platform 1000 structured to execute the instructions 400, 500, 600 of FIGS. 4, 5, and 6 to implement the example system manager 110 of FIGS. 1 and 3. The processor platform 1000 can be, for example, one or more servers, personal computers, workstations, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The example processor 1012 includes the example gateway communicator 300, the example system manager data analyzer 304, and the example policy selector 304.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 of FIGS. 4, 5, and/or 6 may be stored in the mass storage device 1028, in the volatile memory 1014, in the non-volatile memory 1016, and/or on a removable tangible computer readable storage medium such as a CD or DVD.

From the foregoing, it will be appreciated that examples have been disclosed which improve response time and process efficiency of a distributed computing system. Additionally, examples have been disclosed which allow a system manager to manage the levels of measurement quality of the data collection devices within the distributed computing system to manage the bandwidth usage of the distributed computing system. In this manner, the system manager manages limited bandwidth resources while receiving the important portions of the data from the data collection devices (e.g., as defined by the rules). In some example, the system manager utilizes rules and triggers to manager the amount of the data that is sent to the system manager by reducing saves processing resource utilization of the system manager and bandwidth usage. Thus, in some examples, high quality of analysis of data can be performed by minimizing the transmission of less-useful data from gateways to the system manager, while not overburdening the system bandwidth and the processing resources of the system manager.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following further examples, which include subject matter such as a method to adaptively manage data collection devices in distributed computing systems, means for adaptively managing data collection devices in distributed computing systems, at least one article of manufacture comprising instructions that, when executed, cause a system manager to at least adaptively manage data collection devices in distributed computing systems and a system manager to adaptively manage data collection devices in distributed computing systems.

Example 1 is a system manager for managing data collection devices in distributed computing systems, which includes a gateway communicator to send a first rule to a first data collection device in the distributed computing system, the first rule specifying a first operating mode and defining a first event of interest, and obtain first data from the first data collection device while the first data collection device operating according to the first rule. Example 1 also includes a policy selector to, in response to a real-time analyzer determining that the first event of interest has occurred based on the first data, select a second rule based on the first data to send to the first data collection device, the second rule specifying a second operating mode and defining a second event of interest, and select a third rule to send to the second data collection device, the third rule specifying a third operating mode.

Example 2 includes the subject matter of example 1, further including a deep analyzer to analyze historical data aggregated from the first data collection device and second data collection device to identify characteristics of the first event of interest that are predictive of the second event of interest.

Example 3 includes the subject matter of example 2, wherein the deep analyzer is further to generate the second rule based on the identified characteristics.

Example 4 includes the subject matter of example 1, wherein the first operating mode defines a first level of measurement quality to collect data, the second operating mode defines a second level of measurement quality to collect data that is greater than the first level of measurement quality, and the third operating mode defines a third level of measurement quality to collect the data that is less than the first level of measurement quality.

Example 5 includes the subject matter of example 1, wherein the second rule causes the first data collection device to use more bandwidth than when operating according to the first rule.

Example 6 includes the subject matter of example 5, wherein the policy selector is further to select the third rule to cause the second data collection device to used less bandwidth than when operating according to the first rule.

Example 7 includes the subject matter of example 5, wherein the policy selector is further to select the third rule so that a combined bandwidth used by the first data collection device operating according to the second rule and the second data collection device operating according the third rule substantially equals the combined bandwidth of the first and second data collection devices operating according to the first rule.

Example 8 includes the subject matter of example 1 or example 2, wherein the first operating mode defines a first level of measurement quality to collect data, the second operating mode defines a second level of measurement quality to collect data that is greater than the first level of measurement quality, and the third operating mode defines a third level of measurement quality to collect the data that is less than the first level of measurement quality.

Example 9 includes the subject matter of example 8, wherein the second rule causes the first data collection device to use more bandwidth than when operating according to the first rule, and wherein the policy selector is further to select the third rule to cause the second data collection device to used less bandwidth than when operating according to the first rule.

Example 10 includes the subject matter of example 8, wherein the policy selector is further to select the third rule so that a combined bandwidth used by the first data collection device operating according to the second rule and the second data collection device operating according the third rule substantially equals the combined bandwidth of the first and second data collection devices operating according to the first rule.

Example 11 is a method for managing data collection devices in distributed computing systems, including instructing a first data collection device to operate according to a first rule, the first rule specifying a first operating mode and defining a first event of interest, and obtaining first data from the first data collection device while operating according to the first rule. Example 11 also includes in response to determining that the first event of interest has occurred based on the first data, providing a second rule based on the first data to the first data collection device, the second rule specifying a second operating mode and defining a second event of interest, and providing a third rule to a second data collection device, the third rule specifying a third operating mode.

Example 12 includes the subject matter of example 11, further including analyzing historical data aggregated from the first data collection device and second data collection device to identify characteristics of the first event of interest that are predictive of the second event of interest.

Example 13 includes the subject matter of example 12, further including generating the second rule based on the identified characteristics.

Example 14 includes the subject matter of example 11, wherein the first operating mode defines a first level of measurement quality to collect data, the second operating mode defines a second level of measurement quality to collect data that is greater than the first level of measurement quality, and the third operating mode defines a third level of measurement quality to collect the data that is less than the first level of measurement quality.

Example 15 includes the subject matter of example 11, wherein the second rule causes the first data collection device to use more bandwidth than when operating according to the first rule.

Example 16 includes the subject matter of example 15, further including selecting the third rule that causes the second data collection device to used less bandwidth than when operating according to the first rule.

Example 17 includes the subject matter of example 15, further including selecting the third rule so that a combined bandwidth used by the first data collection device operating according to the second rule and the second data collection device operating according the third rule substantially equals the combined bandwidth of the first and second data collection devices operating according to the first rule.

Example 18 includes the subject matter of example 11 or example 12, wherein the first operating mode defines a first level of measurement quality to collect data, the second operating mode defines a second level of measurement quality to collect data that is greater than the first level of measurement quality, and the third operating mode defines a third level of measurement quality to collect the data that is less than the first level of measurement quality, and wherein the second rule causes the first data collection device to use more bandwidth than when operating according to the first rule.

Example 19 includes the subject matter of example 18, further including selecting the third rule that causes the second data collection device to used less bandwidth than when operating according to the first rule.

Example 20 includes the subject matter of example 18, further including selecting the third rule so that a combined bandwidth used by the first data collection device operating according to the second rule and the second data collection device operating according the third rule substantially equals the combined bandwidth of the first and second data collection devices operating according to the first rule.

Example 21 is an article of manufacture comprising instructions that, when executed, cause a system manager to at least instruct a first data collection device to operate according to a first rule, the first rule specifying a first operating mode and defining a first event of interest, and obtain first data from the first data collection device while the first data collection device is operating according to the first rule. Example 21 also includes instructions that, when executed, cause the system manager to, in response to determining that the first event of interest has occurred based on the first data, provide a second rule based on the first data to the first data collection device, the second rule specifying a second operating mode and defining a second event of interest, and provide a third rule to the second data collection device, the third rule specifying a third operating mode.

Example 22 includes the subject matter of example 21, wherein the instructions further cause the system manager to analyze historical data aggregated from the first data collection device and second data collection device to identify characteristics of the first event of interest that are predictive of the second event of interest.

Example 23 includes the subject matter of example 22, wherein the instructions further cause the system manager to generate the second rule based on the identified characteristics.

Example 24 includes the subject matter of example 21, wherein the first operating mode defines a first level of measurement quality to collect data, the second operating mode defines a second level of measurement quality to collect data that is greater than the first level of measurement quality, and the third operating mode defines a third level of measurement quality to collect the data that is less than the first level of measurement quality.

Example 25 includes the subject matter of example 21, wherein the second rule causes the first data collection device to use more bandwidth than when operating according to the first rule.

Example 26 includes the subject matter of example 25, wherein the instructions further cause the system manager to select the third rule so that the second data collection device to uses less bandwidth than when operating according to the first rule.

Example 27 includes the subject matter of example 21, wherein the instructions further cause the system manager to analyze historical data aggregated from the first data collection device and second data collection device to identify characteristics of the first event of interest that are predictive of the second event of interest, and generate the second rule based on the identified characteristics.

Example 28 includes the subject matter of example 21, example 22, or example 27, wherein the first operating mode defines a first level of measurement quality to collect data, the second operating mode defines a second level of measurement quality to collect data that is greater than the first level of measurement quality, and the third operating mode defines a third level of measurement quality to collect the data that is less than the first level of measurement quality, and wherein the second rule causes the first data collection device to use more bandwidth than when operating according to the first rule.

Example 29 includes the subject matter of example 28, wherein the instructions further cause the system manager to select the third rule so that the second data collection device to uses less bandwidth than when operating according to the first rule.

Example 30 includes the subject matter of example 28, wherein the instructions further cause the system manager to select the third rule so that a combined bandwidth used by the first data collection device operating according to the second rule and the second data collection device operating according the third rule substantially equals the combined bandwidth of the first and second data collection devices operating according to the first rule.

Example 31 is an apparatus for managing data collection devices in distributed computing systems including means for instructing a first data collection device to operate according to a first rule, the first rule specifying a first operating mode and defining a first event of interest, and means for obtaining first data from the first data collection device while operating according to the first rule. The apparatus of example 31 also includes, in response to determining that the first event of interest has occurred based on the first data, means for providing a second rule based on the first data to the first data collection device, the second rule specifying a second operating mode and defining a second event of interest, and means for providing a third rule to a second data collection device, the third rule specifying a third operating mode.

Example 32 includes the subject matter of example 31, further including means for analyzing historical data aggregated from the first data collection device and second data collection device to identify characteristics of the first event of interest that are predictive of the second event of interest.

Example 33 includes the subject matter of example 32, further including means for generating the second rule based on the identified characteristics.

Example 34 includes the subject matter of example 31, wherein the first operating mode defines a first level of measurement quality to collect data, the second operating mode defines a second level of measurement quality to collect data that is greater than the first level of measurement quality, and the third operating mode defines a third level of measurement quality to collect the data that is less than the first level of measurement quality.

Example 35 includes the subject matter of example 31, wherein the second rule causes the first data collection device to use more bandwidth than when operating according to the first rule.

Example 36 includes the subject matter of example 35, further including means for selecting the third rule that causes the second data collection device to used less bandwidth than when operating according to the first rule.

Example 37 includes the subject matter of example 35, further including means for selecting the third rule so that a combined bandwidth used by the first data collection device operating according to the second rule and the second data collection device operating according the third rule substantially equals the combined bandwidth of the first and second data collection devices operating according to the first rule.

Example 38 is a machine readable medium including instructions, when executed, cause a machine to perform the method of any one of the subject matter of examples 11, 12, 13, 14, 15, 16, or 17.

What is claimed is:

1. A system device comprising:
    interface circuitry;
    machine-readable instructions; and
    at least one processor circuit to execute the machine-readable instructions to:
        provide a first rule to a first image data collection device, the first rule defining a first event of interest for detection by the first image data collection device;
        provide a second rule to the first image data collection device, the second rule specifying that, responsive to detection of the first event of interest in first image data, the first image data collection device is to filter the first image data and second image data to generate a condensed image stream, that includes a marker representing the first event of interest, the first image data collection device to operate based on the first rule and the second rule;
        obtain the condensed image stream from the first image data collection device;
        responsive to the marker being included in the condensed image stream received from the first image data collection device, select a third rule for the first image data collection device, the third rule defining an operating mode for the first image data collection device; and
        provide the third rule to the first image data collection device, the first image data collection device to operate based on the third rule.

2. The system device of claim 1, wherein the first image data collection device is a first video camera.

3. The system device of claim 1, wherein the second image data corresponds to an output of a second image data collection device, the first image data collection device and the second image data collection device in a same environment.

4. The system device of claim 1, wherein the operating mode defines a property associated with collection of third image data by the first image data collection device.

5. The system device of claim 4, wherein the property includes one or more of image resolution or data collection timing.

6. The system device of claim 1, wherein one or more of the at least one processor circuit is to provide a fourth rule to the first image data collection device, the fourth rule specifying that the first image data collection device is to perform facial recognition to detect the first event of interest, the first image data collection device to operate based on the fourth rule.

7. The system device of claim 1, wherein the condensed image stream includes image data occurring a threshold time before the first event of interest and a threshold time after the event of interest.

8. A non-transitory computer-readable medium comprising machine-readable instructions that cause at least one processor circuit to at least:
    provide a first instruction to a first data collection device in an environment, the first instruction defining an event of interest for detection by the first data collection device in first data of a data stream, the first data generated by the first data collection device;
    provide a second instruction to the first data collection device, the second instruction specifying that, responsive to detection of the event of interest in the first data, the first data collection device is to filter second data from the data stream to generate a filtered data stream that includes the event of interest, the second data generated by the first data collection device or a second data collection device in the environment, the first data collection device to operate based on the first instruction and the second instruction;
    obtain the filtered data stream from the first data collection device;
    after receipt of the filtered data stream from the first data collection device, determine a response to the detection of the event of interest, the response to affect operation of one or more of the first data collection device or the second data collection device; and
    provide a third instruction to the one or more of the first data collection device or the second data collection device, the third instruction corresponding to the determined response, the one or more of the first data collection device or the second data collection device to operate based on the third instruction.

9. The non-transitory computer-readable medium of claim 8, wherein the first data includes video data.

10. The non-transitory computer-readable medium of claim 8, wherein the machine-readable instructions cause one or more of the at least one processor circuit to provide a fourth instruction to the first data collection device, the fourth instruction specifying that the first data collection device is to mark the event of interest in the filtered data stream, the first data collection device to operate based on the fourth instruction.

11. The non-transitory computer-readable medium of claim 8, wherein the third instruction is to affect one or more of image resolution or data collection timing of third data generated by the one or more of the first data collection device or the second data collection device.

12. The non-transitory computer-readable medium of claim 8, wherein the machine-readable instructions cause one or more of the at least one processor circuit to, after receipt of the filtered data stream from the first data collection device, provide a fourth instruction to the first data collection device, the fourth instruction defining a second event of interest for detection by the first data collection device, the first data collection device to operate based on the first data collection device.

13. The non-transitory computer-readable medium of claim 8, wherein the filtered data stream includes video data.

14. A network device comprising:
    interface circuitry;
    machine-readable instructions; and at least one processor circuit to execute the machine-readable instructions to:
- define a first event of interest in an environment;
- provide a first rule to an edge device in the environment, the first rule specifying that the edge device is to identify the first event of interest in first image data generated by a first camera;
- provide a second rule to the edge device, the second rule specifying that to, responsive to the identification of the first event of interest in the first image data, the edge device is to send the first image data but not second image data to the network device, the second image data generated by the first camera or a second camera, the edge device to operate based on the first rule and the second rule; and
- obtain the first image data from the edge device;
- after receipt of the first image data from the edge device, select a third rule to transmit to the edge device, the third rule defining a second event of interest; and
- provide the third rule to the edge device, the edge device to operate based on the third rule.

15. The network device of claim 14, wherein the first image data includes video data.

16. The network device of claim 15, wherein one or more of the at least one processor circuit is to provide a fourth rule to the edge device, the fourth rule specifying that the edge device is to perform facial recognition to detect the first event of interest, the edge device to operate based on the fourth rule.

17. The network device of claim 14, wherein one or more of the at least one processor circuit is to provide a fourth rule to the edge device, the fourth rule specifying that the edge device is to mark the first event of interest in the first image data, the edge device to operate based on the fourth rule.

18. The network device of claim 14, wherein the first image data and the second image data define an image stream and the second rule specifies that the edge device is to filter the image stream to remove the second image data from the image stream.

19. The network device of claim 14, wherein one or more of the at least one processor circuit is to provide a fourth rule to the edge device, the fourth rule to affect a property of third image data generated by the first camera or the second camera, the edge device to operate based on the third rule.

20. The network device of claim 19, wherein the property includes one or more of image resolution or data collection timing.

* * * * *